United States Patent
Kurita et al.

(10) Patent No.: US 10,296,170 B2
(45) Date of Patent: May 21, 2019

(54) ELECTRONIC APPARATUS AND METHOD FOR MANAGING CONTENT

(71) Applicant: Toshiba Client Solutions CO., LTD., Koto-ku, Tokyo (JP)

(72) Inventors: Yukihiro Kurita, Kokubunji Tokyo (JP); Hiroto Yoshihara, Narashino Chiba (JP); Hideya Minamiji, Ichikawa Chiba (JP)

(73) Assignee: Toshiba Client Solutions Co., Ltd., Tokyo (JP)

( * ) Notice: Subject to any disclaimer, the term of this patent is extended or adjusted under 35 U.S.C. 154(b) by 671 days.

(21) Appl. No.: 15/005,978

(22) Filed: Jan. 25, 2016

(65) Prior Publication Data
US 2017/0090692 A1    Mar. 30, 2017

(30) Foreign Application Priority Data

Sep. 29, 2015 (JP) ................. 2015-190835

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04883* (2013.01); *G06F 3/04817* (2013.01)

(58) Field of Classification Search
CPC .......................................... G06F 3/0481–0489
See application file for complete search history.

(56) References Cited

U.S. PATENT DOCUMENTS 6,054,989 A * 4/2000 Robertson ........... G06F 3/04815
715/727
6,400,378 B1 * 6/2002 Snook .................. G11B 27/034
707/999.102
(Continued)

FOREIGN PATENT DOCUMENTS

JP    2009-508274 A    2/2009
JP    2010-033132 A    2/2010
(Continued)

OTHER PUBLICATIONS

Atsushi Nishi, Complete Encyclopedia for Plus Evernote, which allows you to use it easily and instantly, Japan, Gijyutsu-Hyohron co., Ltd., Jul. 10, 2014, first edition, pp. 113, 138-139, 149, 152-155 (already filed), pp. 228-229 (First cited).
(Continued)

*Primary Examiner* — Steven B Theriault
(74) *Attorney, Agent, or Firm* — Knobbe, Martens, Olson & Bear, LLP

(57) ABSTRACT

According to one embodiment, contents which are created by first and second application programs are arranged two-dimensionally according to a first direction and a second direction. The first direction represents a chronological order, and the second direction is perpendicular to the first direction. The first application is one of an application to input handwriting, an application to capture an image, an application to record voice, and an application to clip a part of a document. The second application is another one of the application to input handwriting, the application to capture an image, the application to record voice and the application to clip a part of a document.

8 Claims, 30 Drawing Sheets

(51) Int. Cl.
*G06F 3/0488* (2013.01)
*G06F 3/0481* (2013.01)

(56) References Cited

U.S. PATENT DOCUMENTS

| | | | | |
|---|---|---|---|---|
| 7,257,774 B2* | 8/2007 | Denoue | G06F 17/30017 | 707/E17.009 |
| 7,421,449 B2* | 9/2008 | Williams | G06F 3/0485 | |
| 7,716,194 B2* | 5/2010 | Williams | G06F 17/30061 | 707/705 |
| 7,716,604 B2* | 5/2010 | Kataoka | G06F 3/0481 | 715/757 |
| 7,735,018 B2 | 6/2010 | Bakhash | | |
| 7,757,172 B2* | 7/2010 | Yokoi | G06F 17/3028 | 715/721 |
| 7,779,358 B1* | 8/2010 | Gupta | G06F 17/30274 | 715/730 |
| 7,788,592 B2* | 8/2010 | Williams | G06F 17/30265 | 707/705 |
| 7,853,888 B1* | 12/2010 | Dhawan | G06F 3/0486 | 715/770 |
| 8,074,175 B2* | 12/2011 | Brush | G06Q 10/109 | 715/751 |
| 8,161,410 B2* | 4/2012 | Bray | G06F 3/04815 | 715/835 |
| 8,375,318 B2* | 2/2013 | Masuda | G06F 3/0481 | 715/772 |
| 8,533,594 B2* | 9/2013 | Grossman | G06F 17/2288 | 715/255 |
| 8,881,048 B2 | 11/2014 | Bakhash | | |
| 8,977,980 B2* | 3/2015 | Abe | G06F 3/0485 | 715/786 |
| 9,256,588 B1* | 2/2016 | Moscovich | G06F 17/241 | |
| 9,310,983 B2* | 4/2016 | Somasundaram | G06K 9/46 | |
| 9,465,513 B2* | 10/2016 | Sims | G06F 3/04817 | |
| 2002/0054017 A1* | 5/2002 | Agata | G06F 1/1616 | 345/157 |
| 2003/0070139 A1* | 4/2003 | Marshall | G06F 17/241 | 715/231 |
| 2004/0068423 A1* | 4/2004 | Shaw | G06F 19/321 | 705/3 |
| 2004/0114541 A1* | 6/2004 | Caspi | H04L 29/06027 | 370/260 |
| 2004/0125150 A1* | 7/2004 | Adcock | G06F 17/30274 | 715/810 |
| 2005/0091596 A1* | 4/2005 | Anthony | G06F 3/04815 | 715/712 |
| 2005/0144190 A1* | 6/2005 | Wada | G06F 17/30265 | |
| 2006/0075353 A1* | 4/2006 | DeSpain | G06F 17/24 | 715/770 |
| 2006/0090141 A1* | 4/2006 | Loui | G06F 17/30064 | 715/764 |
| 2006/0224993 A1* | 10/2006 | Wong | G06F 17/30274 | 715/800 |
| 2009/0063492 A1* | 3/2009 | Meyyappan | G06F 3/03545 | |
| 2009/0282003 A1* | 11/2009 | Hirata | G06F 17/30126 | |
| 2009/0307623 A1* | 12/2009 | Agarawala | G06F 3/04815 | 715/765 |
| 2010/0037179 A1 | 2/2010 | Ito | | |
| 2010/0104145 A1* | 4/2010 | Momosaki | G06F 17/30247 | 382/118 |
| 2010/0146450 A1* | 6/2010 | Harada | G06F 17/30126 | 715/838 |
| 2010/0228746 A1* | 9/2010 | Harada | G06F 3/04815 | 707/752 |
| 2011/0234504 A1* | 9/2011 | Barnett | G06F 3/0482 | 345/173 |
| 2012/0137255 A1* | 5/2012 | Folchi | G06F 17/30551 | 715/838 |
| 2013/0047115 A1* | 2/2013 | Migos | G06F 17/241 | 715/776 |
| 2013/0120454 A1* | 5/2013 | Shechtman | G06T 3/4038 | 345/635 |
| 2013/0332831 A1* | 12/2013 | Birnkrant | H04N 21/4622 | 715/719 |
| 2014/0071160 A1 | 3/2014 | Sugiura et al. | | |
| 2014/0072225 A1* | 3/2014 | Ogawa | G06K 9/18 | 382/186 |
| 2014/0082566 A1* | 3/2014 | Matsuo | H04N 1/00453 | 715/838 |
| 2014/0164974 A1* | 6/2014 | Kim | G06F 3/04883 | 715/773 |
| 2014/0189594 A1* | 7/2014 | Hashiba | G06F 3/0483 | 715/835 |
| 2014/0304586 A1 | 10/2014 | Hirabayashi | | |
| 2014/0321749 A1* | 10/2014 | Tsutsui | G06K 9/00463 | 382/186 |
| 2014/0372877 A1* | 12/2014 | Snyder | G06F 9/451 | 715/254 |
| 2015/0026224 A1* | 1/2015 | Yokoyama | G06F 17/30038 | 707/812 |
| 2015/0116284 A1* | 4/2015 | Black | G06F 3/03545 | 345/179 |
| 2015/0121191 A1 | 4/2015 | Nakamori et al. | | |
| 2015/0127643 A1* | 5/2015 | Cohen | G06F 17/30064 | 707/725 |
| 2015/0128059 A1 | 5/2015 | Bakhash | | |
| 2015/0149965 A1 | 5/2015 | Bakhash | | |
| 2015/0154443 A1* | 6/2015 | Ookawara | G06F 17/2247 | 715/234 |
| 2016/0086462 A1* | 3/2016 | Meganathan | G06F 17/30843 | 348/155 |

FOREIGN PATENT DOCUMENTS

| | | |
|---|---|---|
| JP | 2014-052915 A | 3/2014 |
| JP | 2014-203249 A | 10/2014 |
| JP | 2015-087789 A | 5/2016 |

OTHER PUBLICATIONS

Final Office Action mailed by Japan Patent Office dated Dec. 6, 2016 in the corresponding Japanese patent application No. 2015-190835—12 pages.
First Office Action dated Aug. 16, 2016 of Japanese Patent Application 2015-190835—13 pages.
Egaku, "[iPad] Evernote v5.0: A list of notes is more easily viewable with a business-card-like card view", dated Nov. 9, 2012—6 pages.
Nishi, "Complete Encyclopedia for Plus Evernote, which allows you to use it easily and instantly", Japan, Gijuytsu-Hyohron Co., Ltd. Dated Jul. 10, 2014, first edition, pp. 113, 138-139, 149, and 152-155—12 pages.
Jimmy_33, "To Store Image in Evernote (1/4)—PictShare, this is an application which could not be better than any other applications", dated Sep. 7, 2012—7 pages.
Goto, "Want to also store audio data simply in Evernote", dated Dec. 29, 2016—10 pages.
Iida, Mac People, Japan, ASCII Media Works, Co., Ltd., dated Oct. 29, 2011, vol. 17, No. 19, pp. 54-47—8 pages.
Rashita, "Characteristics of Card View Thumbnail of Evernote", Dated Apr. 21, 2012—16 pages.
"How to scan and save documents," Evernote Basic & Useful Complete Guide, New Function 15, ScanSnap Evernote Edition, Apr. 25, 2014, pp. 68-71.

* cited by examiner

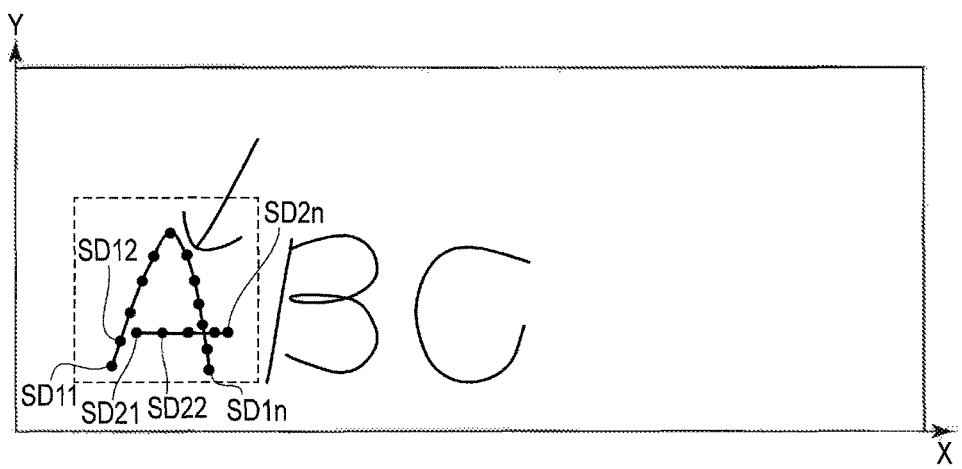
F I G. 3

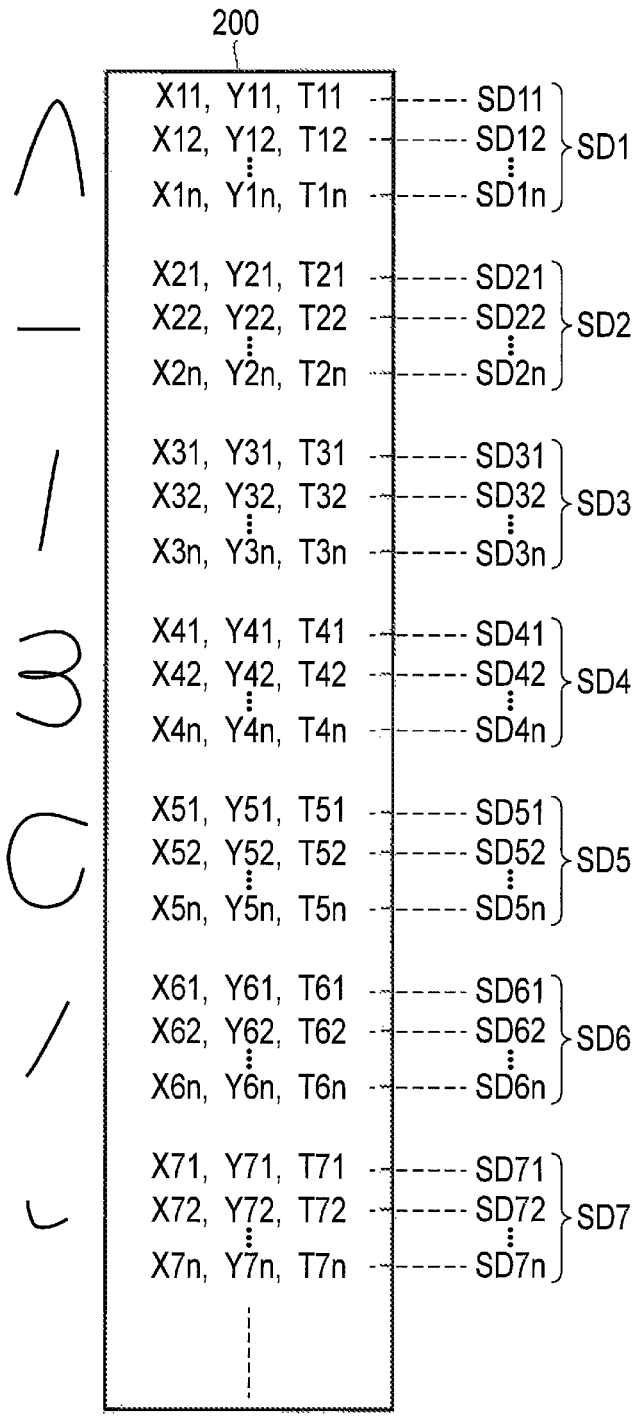
F I G. 4

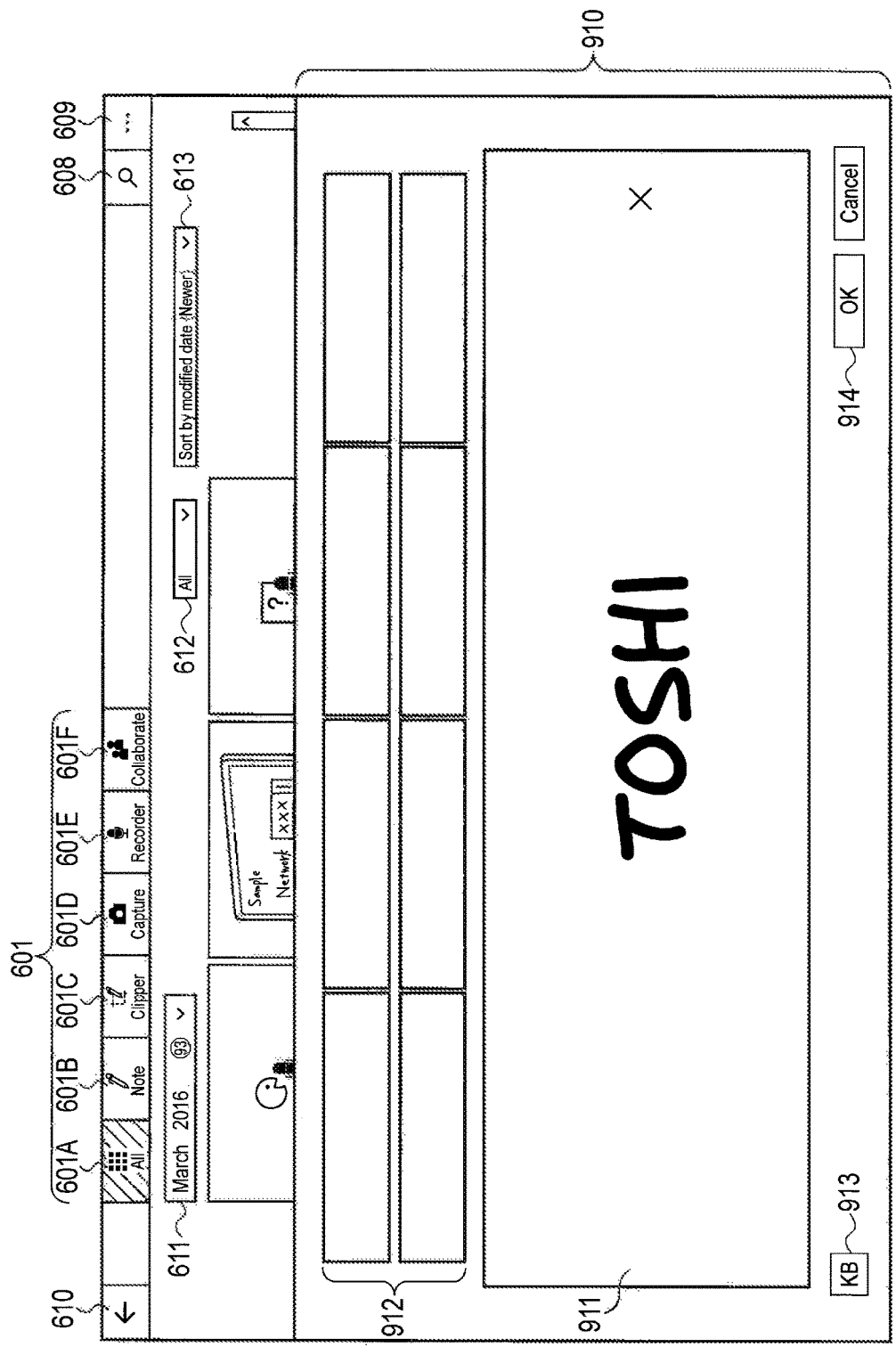
F I G. 25

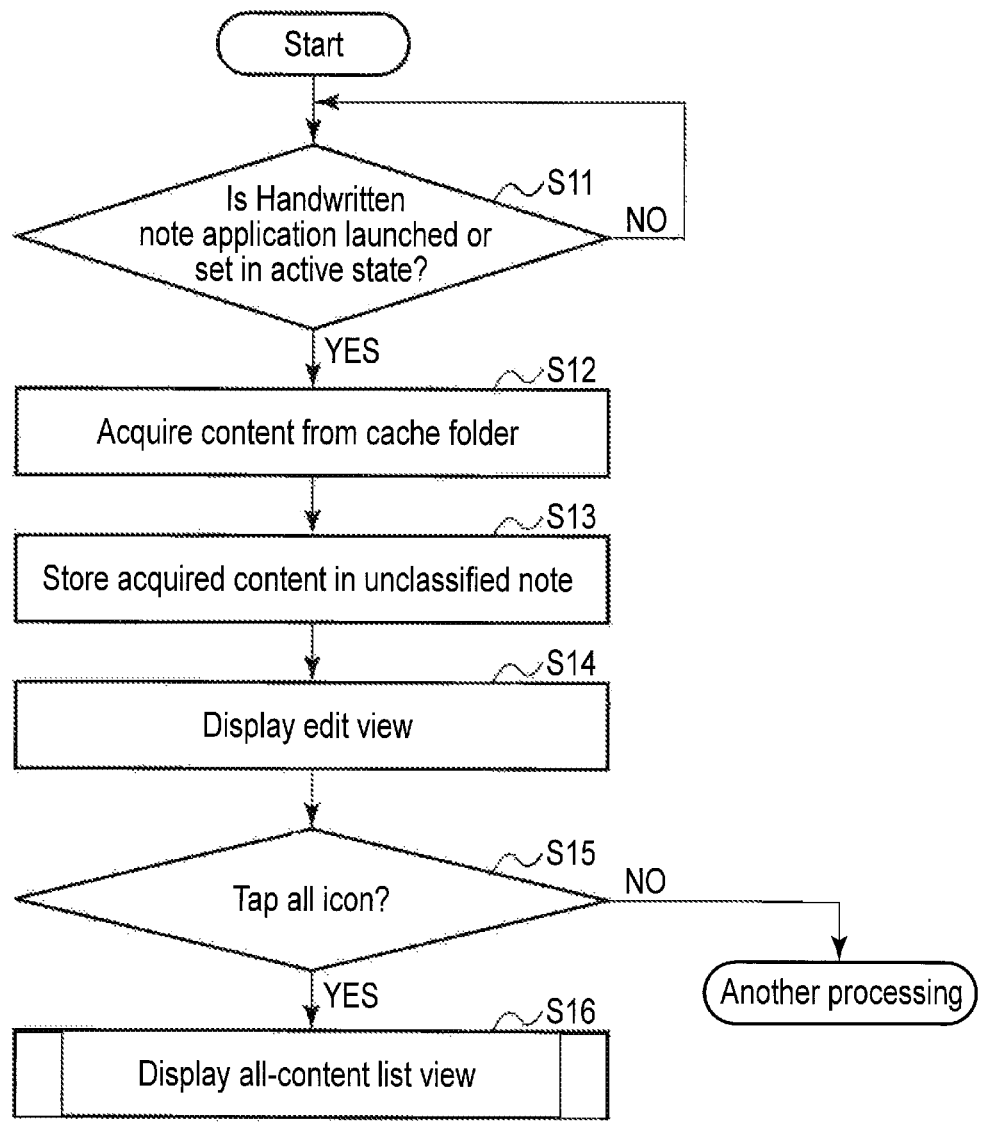
F I G. 27

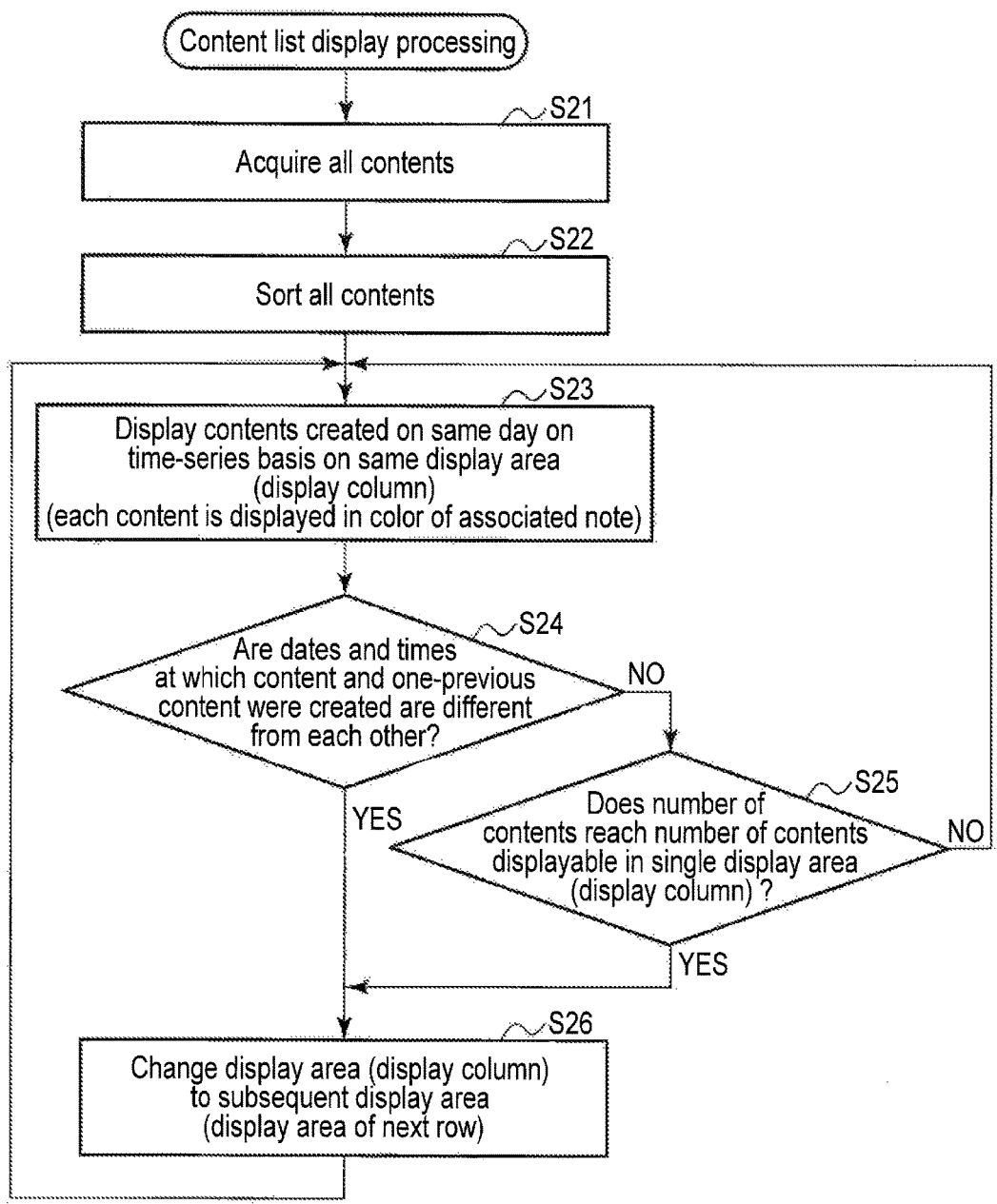
F I G. 28

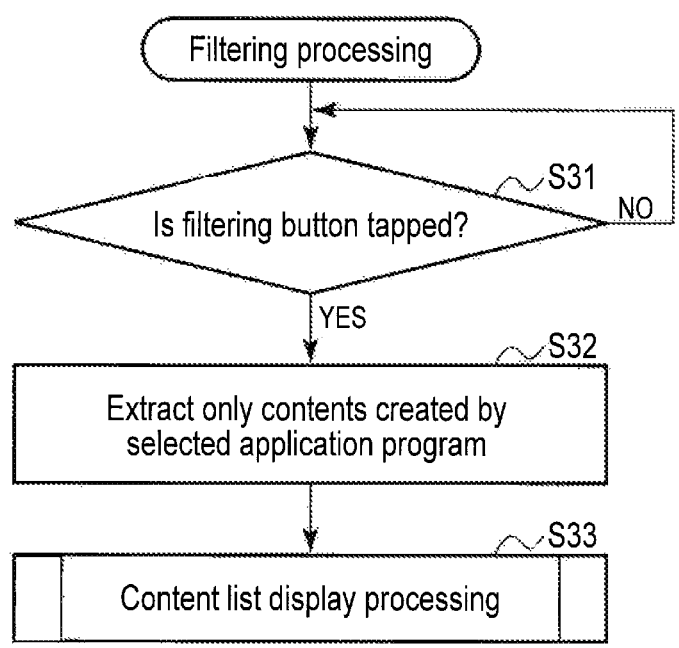
F I G. 29

ELECTRONIC APPARATUS AND METHOD FOR MANAGING CONTENT

CROSS-REFERENCE TO RELATED APPLICATIONS

This application is based upon and claims the benefit of priority from Japanese Patent Application No. 2015-190835, filed Sep. 29, 2015, the entire contents of which are incorporated herein by reference.

FIELD

Embodiments described herein relate generally to a technique of managing content.

BACKGROUND

In recent years, various electronic apparatuses such as a personal computer, a tablet computer, a PDA and a smartphone have been developed.

Also, recently, various application programs have been developed which can be used in various business situations such as a conference, negotiations and a presentation.

Of a plurality of contents created by such application programs, contents which are related to each other are present, for example, which concern the same conference. It is therefore necessary to realize a new function of indicating, for a user, the relevance between plural contents created by different application programs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an illustration showing an example of a handwritten document which is handwritten on a touch screen display of the electronic apparatus as shown in FIG. 1.

FIG. 4 is an exemplary view for explaining time-series data produced by the electronic apparatus shown in FIG. 1.

FIG. 25 is a view showing an example of a search screen displayed by the electronic device as shown in FIG. 1.

FIG. 27 is an exemplary flowchart showing a procedure of an edit view/all-content list view display processing which is executed by the electronic device as shown in FIG. 1.

FIG. 28 is an exemplary flowchart showing a procedure of the all-content list view display processing which is executed by the electronic device as shown in FIG. 1.

FIG. 29 is an exemplary flowchart showing a procedure of a filtering processing which is executed by the electronic device as shown in FIG. 1.

DETAILED DESCRIPTION

Various embodiments will be described hereinafter with reference to the accompanying drawings.

In general, according to one embodiment, an electronic apparatus comprises a storage, a display and a hardware processor. The storage is configured to store a first content, a second content, a third content, and a fourth content, the first content being created by a first application in a first time period, the second content being created by a second application different from the first application in the first time period, the third content being created by the first application in a second time period after the first time period, the fourth content being created by the second application in the second time period. The hardware processor is configured to display on the display a first thumbnail of the first content, a second thumbnail of the second content, a third thumbnail of the third content and a fourth thumbnail of the fourth content. The first application is one of an application to input handwriting, an application to capture an image, an application to record voice, and an application to clip a part of a document. The second application is another one of the application to input handwriting, the application to capture an image, the application to record voice and the application to clip a part of a document. The second application is different from the first application. The first to fourth thumbnails are arranged two-dimensionally according to a first direction and a second direction. The first direction represents a chronological order, and the second direction is perpendicular to the first direction. Both the first and second thumbnails are arranged in accordance with a first position on the first direction. Both the third and fourth thumbnails are arranged in accordance with a second position on the first direction. The first and second thumbnails are arranged along a second direction. The third and fourth thumbnails are arranged along the second direction.

Figure 1:
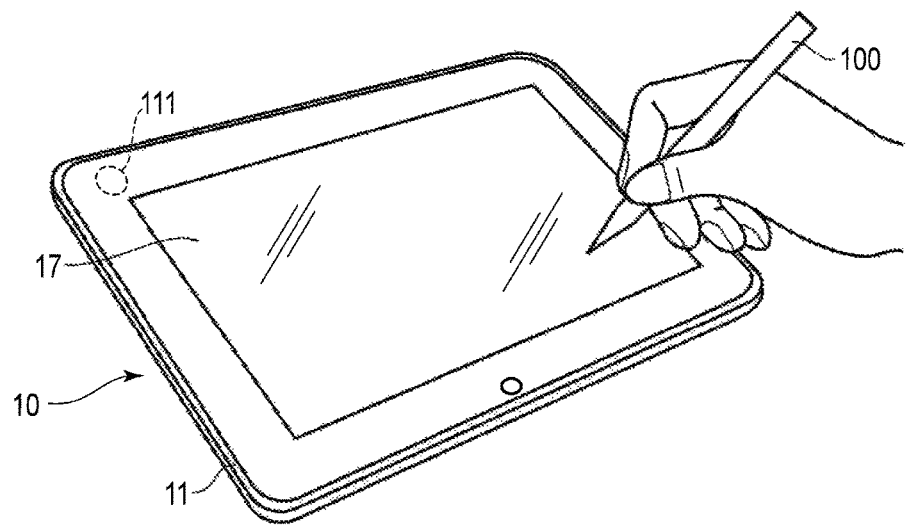
FIG. 1 is an exemplary perspective view showing an appearance of an electronic apparatus according to an embodiment.

FIG. 1 is a perspective view showing an outer appearance of an electronic apparatus according to an embodiment. The electronic apparatus is, for example, a pen-based portable electronic apparatus which enables handwriting input to be performed using a pen (stylus) or finger. The electronic apparatus may be realized as, for example, a tablet computer, a notebook personal computer, a smartphone, a PDA, or the like. The following explanation is given with respect to the case where the electronic apparatus is realized as a tablet computer 10. The tablet computer 10 is a portable electronic apparatus also referred to as a tablet or a slate computer. The tablet computer 10, as shown in FIG. 1, comprises a main body 11 and a touch screen display 17. The main body 11 includes a housing formed in the shape of a thin box. A camera 111 is provided on a back surface of the main body 11. The touch screen display 17 is attached to the main body 11 so as to be laid on a front surface of the main body 11.

In the touch screen display 17, a flat panel display and a sensor are incorporated. The sensor is configured to detect a touch position of the pen or finger on the screen of the flat panel display. The flat panel display may be, for example, a liquid-crystal display (LCD). As the sensor, for example, a capacitance-type touch panel or an electromagnetic-induction-type digitizer may be used. Also, in the following explanation, it is assumed that the touch panel is incorporated in the touch screen display 17, although it does not always need to be done.

The touch panel is provided on, for example, a screen of the flat panel display. The touch screen display 17 can detect not only a touch operation of a finger on the screen, but a touch operation of a pen 100 on the screen. As examples of the pen 100, an active pen, a passive pen, etc., are present. In the following explanation, it is assumed that an active pen is used as the pen 100, although the pen 100 is not limited to the active pen.

A user can perform a handwriting input operation on the touch screen display 17 using an external object (the pen 100 or a finger). In the handwriting input operation, a locus of movement of the external object (the pen 100 or finger) on the screen, i.e., handwriting, is drawn in a real time. A locus of the movement of the external object during the time when the external object is in contact with the screen corresponds to one stroke. Thus, a plurality of strokes corresponding to characters or a figure input by handwriting form a handwritten document.

In the embodiment, the handwritten document is stored in a storage medium as time-series data, not image data, the time-series data indicating a coordinate string of the locus of each stroke and a relationship in sequence between the strokes. Although it will be explained in detail later with reference to FIG. 4, the time-series data includes plural stroke data corresponding to the strokes, respectively. Each of the plural stroke data corresponds to an associated single stroke, and includes a coordinate data sequence (time-series coordinates) corresponding to respective points on the stroke. The sequence of the plural stroke data corresponds to the order in which the strokes were handwritten, that is, a stroke order.

The tablet computer 10 can read arbitrary existing time-series data (handwritten document information) from the storage medium and display handwriting (plural strokes) indicated by the handwritten document information on the screen. Also, the tablet computer 10 has an edit function. The edit function can delete or move an arbitrary stroke, an arbitrary handwritten character or the like in a currently displayed handwritten document by use of an "eraser" tool, a "range selection" tool, and other various tools. Furthermore, the edit function also includes an undo function of canceling a history of several handwriting operations.

The tablet computer 10 further has an auto-complete (stroke suggest) function. The auto-complete function is a function of assisting a user's handwriting input operation in order to enable a large number of character strings to be easily input by handwriting.

Figure 2:
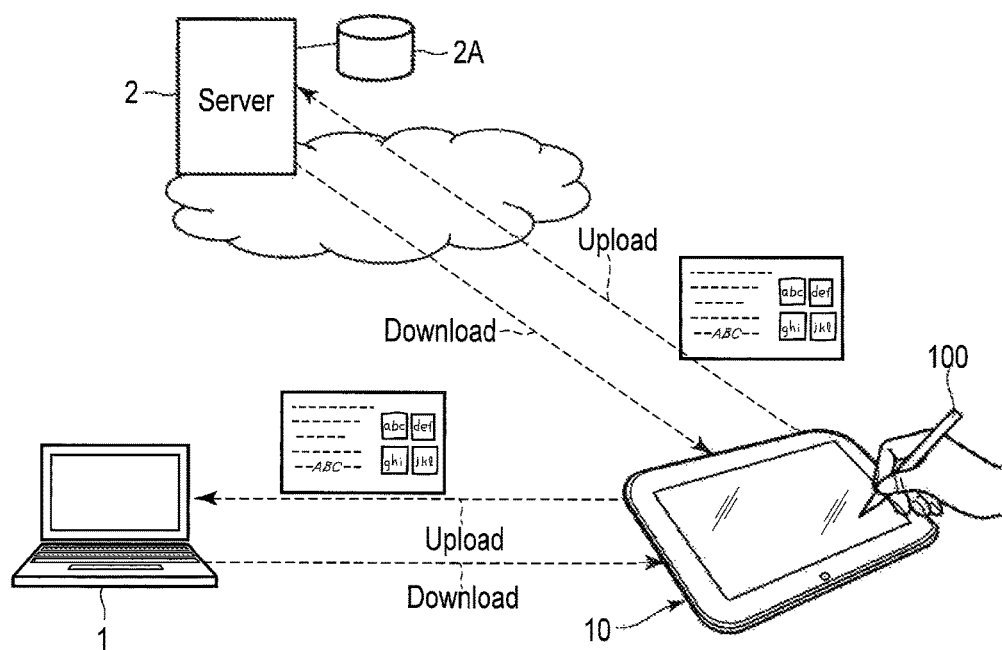
FIG. 2 is an exemplary view showing a collaborative operation of the electronic apparatus as shown in FIG. 1 and an external device.

FIG. 2 shows an example of a collaborative operation of the tablet computer 10 and an external device. The tablet computer 10 can cooperate with the personal computer 1 or a cloud. To be more specific, the tablet computer 10 comprises a wireless communication device such as a wireless LAN, and can perform wireless communication with the personal computer 1. In addition, the tablet computer 10 also can communicate with a server 2 on the Internet. The server 2 may be provided as a server which executes an on-line storage service or other various cloud computing services.

The personal computer 1 includes a storage device such as a hard disk drive (HDD). The tablet computer 10 can transmit time-series data (handwritten document) to the personal computer 1 via a network to record the time-series data in an HDD of the personal computer 1 (upload).

By virtue of the above feature, the tablet computer 10 can handle a large number of time-series data items (handwritten document) or a large amount of time-series data (handwritten document) even if the storage in the tablet computer 10 has a small capacity.

Furthermore, the tablet computer 10 can read (download) one or more arbitrary handwritten documents recorded in the HDD of the personal computer 1. The tablet computer 10 can display each of strokes indicated as the read handwritten document on the screen of the touch screen display 17 of the tablet computer 10.

Also, the tablet computer 10 may communicate with the server 2 on a cloud which offers a storage service, etc., not the personal computer 1. The tablet computer 10 can transmit the handwritten document to the server 2 via the network, and record (upload) the handwritten document in a storage device 2A of the server 2. Also, the tablet computer 10 can read (download) an arbitrary handwritten document recorded in the storage device 2A of the server 2. The tablet computer 10 can display each of strokes indicated as the read handwritten document on the screen of the touch screen display 17 of the tablet computer 10.

In such a manner, in the embodiment, a storage medium in which the handwritten document is to be stored may be any of the storage device in the tablet computer 10, the storage device in the personal computer 1, and the storage device in the server 2.

Next, with reference to FIGS. 3 and 4, it will be explained what relationship is established between strokes (characters, marks, a figure (diagram), a table, etc.) handwritten by the user and the handwritten document. FIG. 3 shows an example of a character string handwritten on the touch screen display 17 with the pen 100 or the like.

In many cases, in a handwritten document, a character or figure is handwritten in the document, and another character or figure is handwritten on the character or figure which has been already written. In FIG. 3, it is assumed that the character string "ABC" is handwritten in the order of "A", "B", and "C", and an arrow is then handwritten very close to the handwritten character "A".

The handwritten character "A" is expressed by two strokes (the "∧" stroke and the "-" stroke) handwritten with the pen 100 or the like. The "∧" stroke is the locus having a "∧"-shape, and the "-" stroke is the locus having a "-"-shape. The locus of the "∧" stroke handwritten first with the pen 100 is sampled in real time at regular intervals, thereby obtaining time-series coordinates SD11, SD12, . . . , SD1n of the "∧" stroke. Also, the locus of the "-" stroke next handwritten with the pen 100 is also sampled in real time at regular intervals, thereby obtaining time-series coordinates SD21, SD21, . . . , SD2n of the "-" stroke.

The handwritten character "B" is expressed by two strokes handwritten with the pen 100 or the like, that is, by two loci. The handwritten letter "C" is expressed by a single stroke handwritten with the pen 100, etc., i.e., by a single locus. The handwritten arrow is expressed by two strokes handwritten with the pen 100, etc., i.e., it is expressed by two loci.

FIG. 4 shows time-series data200 corresponding to the handwritten character string shown in FIG. 3. The time-series data200 includes a plurality of stroke data SD1, SD2, . . . , SD7. In the time-series data200, stroke data SD1, SD2, . . . , SD7 are arranged on a time-series basis in the order of handwriting, i.e., in the order in which corresponding strokes were handwritten.

In the time-series data 200, the first two stroke data SD1 and SD2 indicate two strokes constituting the handwritten character "A", respectively. The third and fourth stroke data SD3 and SD4 indicate two strokes constituting the handwritten character "B", respectively. The fifth stroke data SD5 indicates a single stroke constituting the handwritten character "C". The sixth and seventh stroke data SD6 and SD7 indicate two strokes constituting the handwritten arrow, respectively.

Each of the stroke data includes a plurality of coordinate data items corresponding to the coordinates of the points on the locus of an associated single stroke. In each stroke data, plural coordinate data items are arranged on a time-series basis in the order of making an associated stroke. For example, with respect to the handwritten character "A", stroke data SD1 includes a coordinate data series (time-series coordinates) respectively corresponding to the points on the locus of the "∧" stroke of the handwritten character "A", that is, n coordinate data items SD11, SD12, . . . , SD1n. Stroke data SD2 includes a coordinate data series corresponding to the points on the locus of the "-" stroke of the handwritten character "A", that is, n coordinate data items SD21, SD22, . . . , SD2n. It should be noted that the number of coordinate data items may vary from one stroke data item to another.

Each of coordinate data items indicates an x-coordinate and a y-coordinate of an associated point on the corresponding locus. For example, coordinate data item SD11 indicates x-coordinate (X11) and y-coordinate (Y11) of the start point of the "∧" stroke. SDin indicates x-coordinate (Xin) and y-coordinate (Yin) of the end point of the "∧" stroke.

Furthermore, each coordinate data item may include time stamp data T indicating the point of time at which a point corresponding to associated coordinates was handwritten. The point of time at which the point was handwritten may be indicated as absolute time (for example, year, month, day, hours, minutes, seconds) or relative time based on a certain time point used as a reference. For example, it may be set that to each stroke data, absolute time (for example, year, month, day, hours, minutes, seconds) at which an associated stroke started to be written is added as time stamp data, and further to each of coordinate data items in the stroke data, relative time indicating the difference between the absolute time and reference time is added as time stamp data T.

In addition, data (Z) indicating a pen pressure may be added to each coordinate data item.

Figure 5:
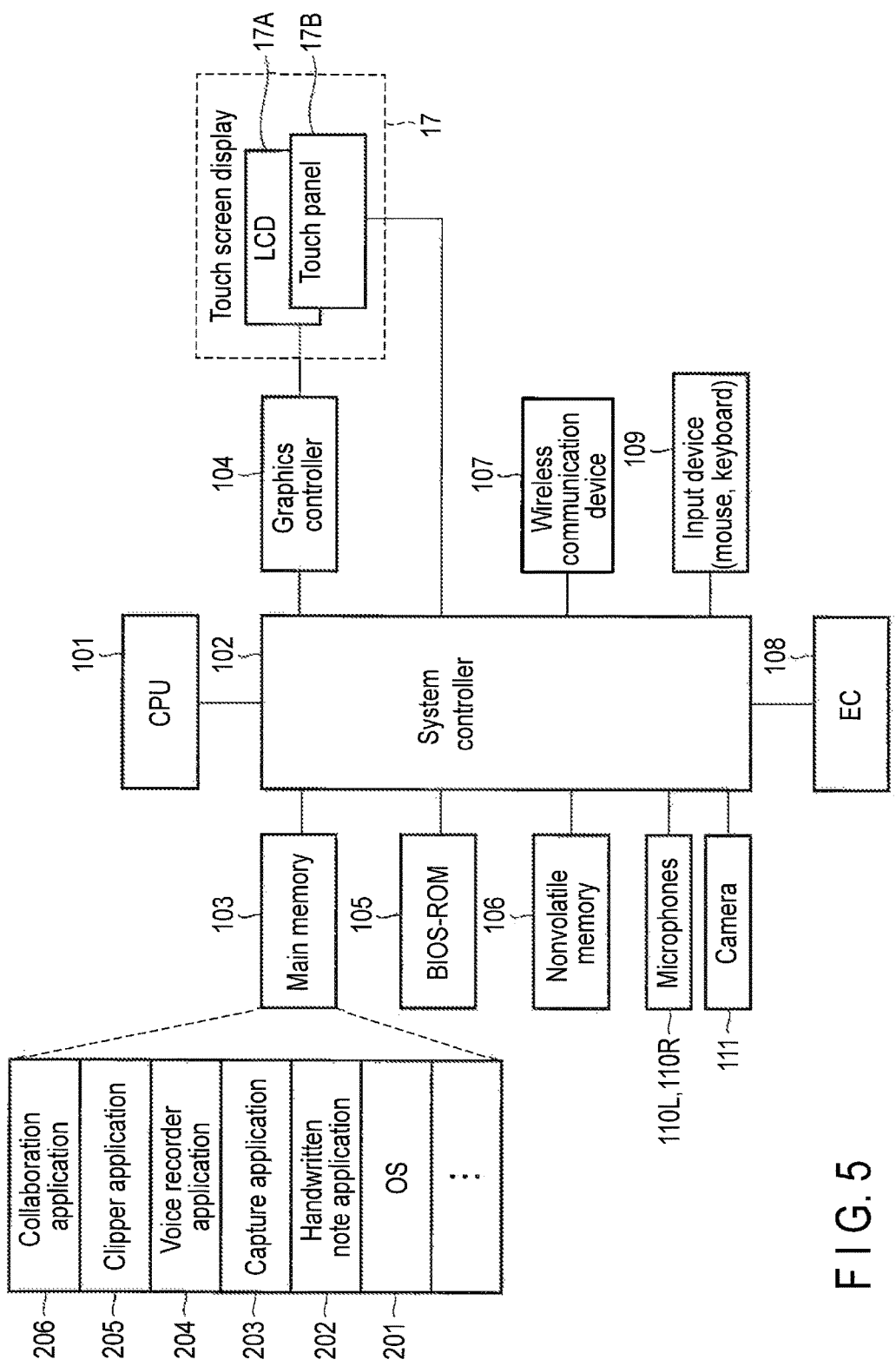
FIG. 5 is an exemplary block diagram showing a system configuration of the electronic apparatus as shown in FIG. 1.

FIG. 5 shows a system configuration of the tablet computer 10.

As shown in FIG. 5, the tablet computer 10 comprises a CPU 101, a system controller 102, a main memory 103, a graphics controller 104, a BIOS-ROM 105, a nonvolatile memory 106, a wireless communication device 107, an embedded controller (EC) 108, two microphones 110L and 110R, a camera 111, etc.

The CPU 101 is a processor (hardware processor) configured to control operations of components in the tablet computer 10. The processor includes processing circuitry. The CPU 101 executes various computer programs loaded from the nonvolatile memory 106 serving as a storage device to the main memory 103. Those programs include an operating system (OS) 201 and various application programs. The application programs include a handwritten note application program 202, a capture application program 203, a voice recorder application program 204, a clipper application program 205, a collaboration application program 206, etc.

The handwritten note application program 202 is a digital notebook application capable of taking note. That is, the handwritten note application program 202 is a application to input handwriting. The handwritten note application program 202 has a function of creating and displaying a handwritten document, a function of editing the handwritten document, an auto-complete function, etc. Also, the handwritten note application program 202 has a function for cooperating with other kinds of application programs. Because of this function, the handwritten note application program 202 can acquire data (contents) created by the other kinds of application programs from the application programs. Each of the other kinds of application programs may manage created data by itself, and provide, for example, a copy (replica) of the created data to the handwritten note application program 202.

Examples of the application programs with which the handwritten note application program 202 cooperates may include the above capture application program 203, voice recorder application program 204, clipper application program 205 and collaboration application program 206.

The capture application program 203, the voice recorder application program 204, the clipper application program 205 and the collaboration application program 206, as well as the handwritten note application program 202, can be used on a daily basis in various business situations.

The capture application program 203 is an application program configured to capture an image of an object using the camera 111. Also, the capture application program 203 can capture various document images such as a whiteboard, a paper material, a book, a notebook and a business card. That is, the capture application program 203 functions an application to capture images.

Also, the capture application program 203 has a function of correcting the shape of an object in a captured document image.

The voice recorder application program 204 is an application program configured to record voice, and can record voice in various situations such as a conference and a presentation. The voice recorder application program 204 supports a speaker clustering function. The speaker clustering function can classify each of speech segments in recording data into a plurality of clusters which are associated with a plurality of speakers, respectively. The voice recorder application program 204 can cause the speech segments to be individually displayed in association with the respective speakers, using the result of speaker clustering. By virtue of this visualizing function for the recording data, it is possible to indicate which speaker spoke and when the speaker spoke, such that they are easily understandable. Also, the voice recorder application program 204 can determine the kind of the recording data based on the number of speakers, the total speaking time of each of the speakers, the time length of the recording data, etc. Kinds of recording data may include a voice memorandum which includes speaking of a given speaker and whose total time length is short, and recording data on a conference which includes speaking of a plurality of speakers and whose total time length is long, and etc.

The clipper application program 205 is an application program to clip a part of a document (electrical document) displayed on the screen. The clipper application program 205 may capture as clip data, various screen images displayed on an LCD 17A of the tablet computer 10. The clipper application program 205 may have a handwriting function of causing a stroke to be handwritten on clip data.

The collaboration application program 206 supports a handwriting collaboration function. The handwriting collaboration function delivers in real time, stroke data handwritten by any of a plurality of devices participating in the same group, to each of the other devices in the group. Thereby, the devices can be synchronized with each other with respect to the contents of a handwritten document displayed on the screen of each of the devices.

In addition, the CPU 101 executes a basic input output system (BIOS) stored in the BIOS-ROM 105. The BIOS is a program for hardware control.

The system controller 102 is a device which connects a local bus of the CPU 101 to various components. The system controller 102 incorporates a memory controller which controls an access to the main memory 103. In addition, the system controller 102 also has a function of communicating with the graphics controller 104 via, for example, a serial bus conforming to the PCI EXPRESS standard.

The graphics controller 104 is a display controller which controls the LCD 17A, which is applied as a display monitor of the tablet computer 10. The display controller includes a display control circuit. A display signal produced by the graphics controller 104 is sent to the LCD 17A. The LCD 17A displays a screen image based on the display signal. A touch panel 17B is provided on the LCD 17A.

The wireless communication device 107 is a device (transceiver) configured to perform wireless communication such as a wireless LAN or 3G mobile communication. The EC 108 is a one-chip microcomputer including an embedded controller for power management. The EC 108 has a function of turning on or off the tablet computer 10 in accordance with a user's operation on a power button. The tablet computer 10 may include a peripheral interface to execute communication with input devices 109 (mouse, keyboard, etc.).

<Features of Handwritten Note Application Program 202>

Some features of the handwritten note application program 202 will be explained.

<Handwriting Search Function>

The handwritten note application program 202 can search for a desired page including desired handwriting (a handwritten character, a handwritten figure, a handwritten table or the like), by performing a handwriting (stroke) search. This function is based on a recognition technique.

When the user inputs handwriting (one or more strokes) as a search key, two methods can be used to search for a desired page. One of the methods is a pattern matching of handwriting features (stroke features), and the other is a character matching based on a character recognition. Based on the input handwriting (one or more strokes), the handwritten note application program 202 automatically changes a method (algorithm) for use in the search between the pattern matching and the character matching. For example, with respect to the input handwriting (one or more strokes), if the likelihood of handwriting of a character string is strong, i.e., if there is a strong possibility that the input handwriting may be those of a character string, the character matching is applied. On the other hand, with respect to the input handwriting (one or more strokes), if the likelihood of handwriting of a character string is small, i.e., if there is a strong possibility that the input one or more strokes may be a figure, a table or a mark, a pattern matching of features of the strokes is applied.

In the pattern matching of the features of the strokes, handwriting having a feature similar to that of the handwriting input as a search key is searched for. For example, handwriting having a shape similar to that of the handwriting input as the search key is searched for. Thereby, of a plurality of pages (handwritten pages) including strokes input by handwriting, a page (handwritten page) including a handwritten mark (for example, a star mark) can be easily searched for.

In the character matching based on the character recognition, the handwriting input as the search key is converted into a text (a character string), using the character recognition. Then, a page including the same character string as the text (character string) of the search key is searched for.

<Recognition and Formatting Function>

The handwritten note application program 202 converts a selected handwritten object (for example, a handwritten letter, a handwritten figure or a handwritten table) into a formatted object. The formatted object is an object having a data format which can be dealt with by another application program. The handwritten note application program 202 converts a selected handwritten object into a formatted object, and copies (stores) the formatted object to a clipboard. Applications on which the object is to be pasted are a presentation application and a word processing application. Processing for converting the selected handwritten object into the formatted object is executed using the character recognition, a figure recognition and a table recognition. In the character recognition, strokes corresponding to a handwritten character string are converted into a recognized text. In the figure recognition, strokes corresponding to a handwritten figure are converted into a formatted figure object. In the table recognition, strokes corresponding to a handwritten table are converted into a formatted table object.

Auto-Complete Function

The handwritten note application program 202 has an auto-complete function. The auto-complete function displays on the display, one or more handwriting candidates based on a stroke or strokes (temporary strokes) handwritten by the user. The handwriting candidates are determined from the temporary strokes. If any of one or more handwriting candidates is selected by the user, the auto-complete function can enter the selected handwriting candidate to a page in place of the temporary strokes.

For example, when temporary stroke corresponding to the character "a" is input by the user, a handwriting candidate menu including handwriting corresponding to the character string "apple", handwriting corresponding to the character string "application", handwriting corresponding to the character string "approval", etc., may be displayed on the display. When the user selects a handwriting candidate in the handwriting candidate menu, the handwritten note application program 202 enters the selected handwriting candidate in place of the temporary stroke "a". In other words, the temporary stroke input by the user is completed with the selected handwriting candidate.

In the auto-complete function, a handwriting candidate is extracted from a handwritten document which was previously input by the user. This means that the user can reuse the handwritten document previously input by the user.

All-Content List Display Function

The handwritten note application program 202 can manage not only a handwritten pages created by itself, but contents created by other application programs (for example, the capture application program 203, the voice recorder application program 204, the clipper application program 205 or the collaboration application program 206). The handwritten pages and the contents created by the other application programs are managed as data (data files).

The handwritten note application program 202 displays on an all-content listing view, a list of a plurality of kinds of contents created by a plurality of kinds of application programs, i.e., a list of all contents (all data files) including the handwritten pages and the contents created by the other application programs. The all-content listing view is a screen (all-content listing screen) for displaying contents created by the handwritten note application program 202, and is displayed by the handwritten note application program 202.

In a conference, there is a case where while taking a note by handwriting, voice made in the conference is recorded, or a paper material or an image on a whiteboard is captured by using the camera 111. In this case, there is a possibility that the dates and times at which those voice data and image data were created and those at which the handwritten page was created (or updated) may be within a given time period.

Therefore, of a plurality of kinds of contents, only plural kinds of contents (plural kinds of first contents) created in the give time period are displayed by the handwritten note application program 202 on a time-series basis in a given display area of the all-content listing view. Thereby, for example, a certain handwritten page and content created by another application at substantially the same time as the certain handwritten page are displayed in areas of the all-content listing view which are close to each other. Thereby the relevance between the certain handwritten page and the content created by the other application program can be presented to the user.

An all-content list display function is a function which is performed by the handwritten note application program 202. Thus, the user can view a list of plural kinds of contents created by the plurality of application programs including the handwritten note application program 202, simply by launching the handwritten note application program 202.

Figure 6:
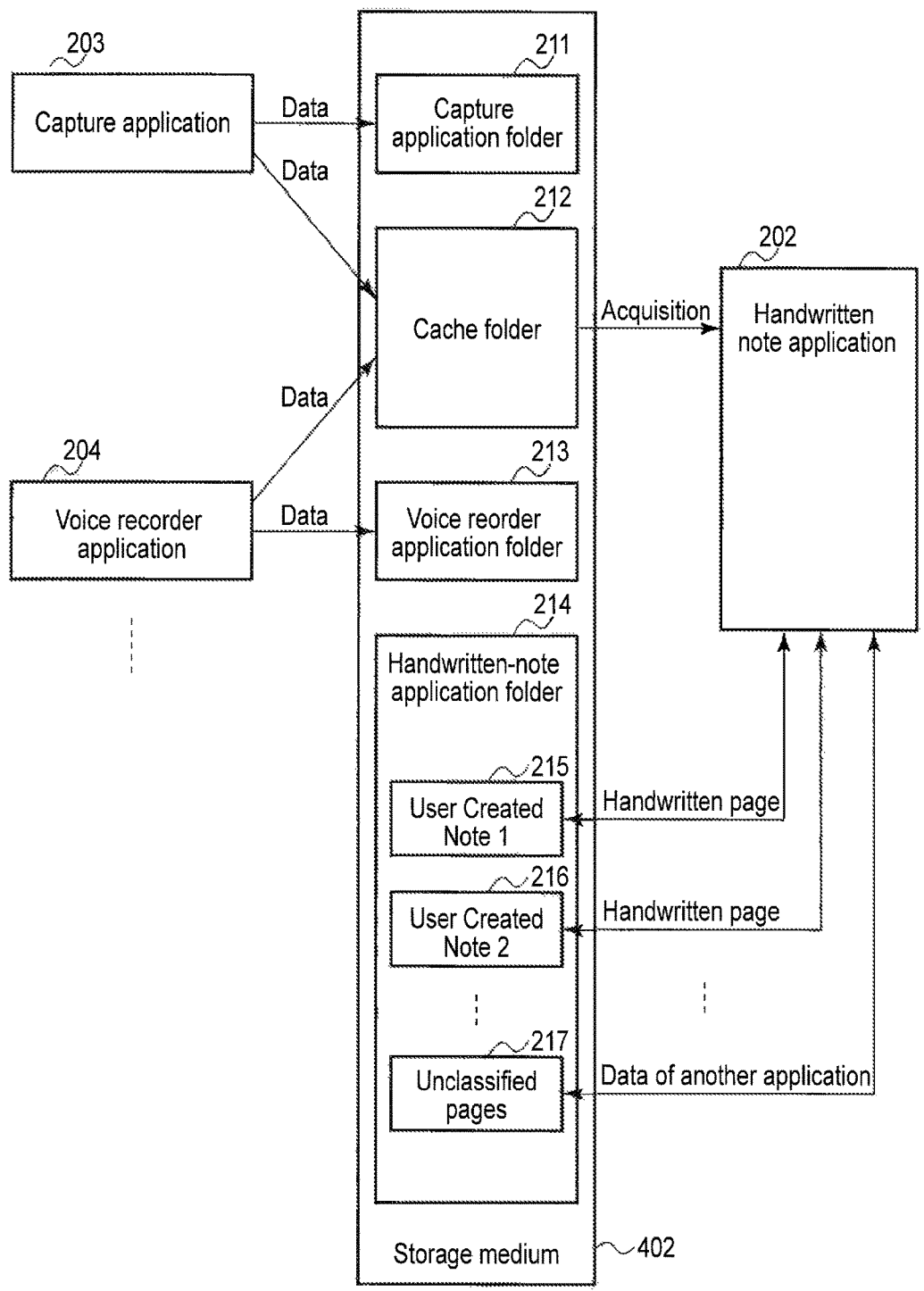
FIG. 6 is an exemplary view showing cooperative operations between plural kinds of application programs, which are performed on the electronic apparatus as shown in FIG. 1.

FIG. 6 shows cooperative operations between a plurality of kinds of application programs.

The handwritten note application program 202 can receive data (contents) from each of other application programs such as the capture application program 203 and the voice recorder application program 204, etc.

The capture application program 203 may save data (for example, content such as an image data file) created by the capture application program 203 into a capture application folder 211 in a storage medium 402, and provide a copy of the data (content) to the handwritten note application program 202. In this case, the capture application program 203 may directly transmit the copy of the data (content) to the handwritten note application program 202 or save the copy of the data (content) into a folder (cache folder 212) shared among the above plurality of kinds of application programs.

Similarly, the voice recorder application program 204 may save data (for example, content such as a voice data file) created by the voice recorder application program 204 into a voice recorder application folder 213 in the storage medium 402, and provide a copy of the data (content) to the handwritten note application program 202. Ordinarily, the size of the voice data file is very large. Therefore, the voice recorder application program 204 may provide to the handwritten note application program 202 only metadata of the voice data, not the copy itself of the voice data. In this case, the voice recorder application program 204 may directly transmit at least a part of the metadata of the voice data to the handwritten note application program 202 or save the at least a part of metadata into the cache folder 212.

The cache folder 212 may be created at the time of, for example, installing the handwritten note application program 202. After creation of the cache folder 212, each time content created by each of the capture application program 203 and the voice recorder application program 204 is saved into the folder of the above each of the capture application program 203 and the voice recorder application program 204, each of the capture application program 203 and the voice recorder application program 204 may save a copy of the content into the cache folder 212.

When the handwritten note application program 202 is launched for the first time, the handwritten note application program 202 may store in the cache folder 212, some data (files) for notifying other application programs such as the capture application program 203 and the voice recorder application program 204, etc, that the handwritten note application program 202 becomes available.

Each of the capture application program 203 and the voice recorder application program 204 may determine whether or not the handwritten note application program 202 becomes available or not, by referring to the cache folder 212 every time each of the capture application program 203 and the voice recorder application program 204 is launched. When determining that the handwritten note application program 202 becomes available, each of the capture application program 203 and the voice recorder application program 204 may ask the user whether to share existing created data (contents) with the handwritten note application program 202 or not. If permitted by the user to share the existing created data, each of the capture application program 203 and the voice recorder application program 204 may save a copy of each of the existing created data into the cache folder 212.

The handwritten note application program 202 saves each of handwritten pages into a handwritten-note application folder 214 in the storage medium 402. Those handwritten pages are saved while being associated with one note of the notes. The notes include notes (User Created Note1, User Created Note 2) 215 and 216 created by the user, and a note (Unclassified Note) 217 created in advance.

When the handwritten note application program 202 is launched or focused, it acquires data (contents) from the cache folder 212, and saves the data (contents) into the handwritten-note application folder 214 as contents in Unclassified Note 217.

Figure 7:
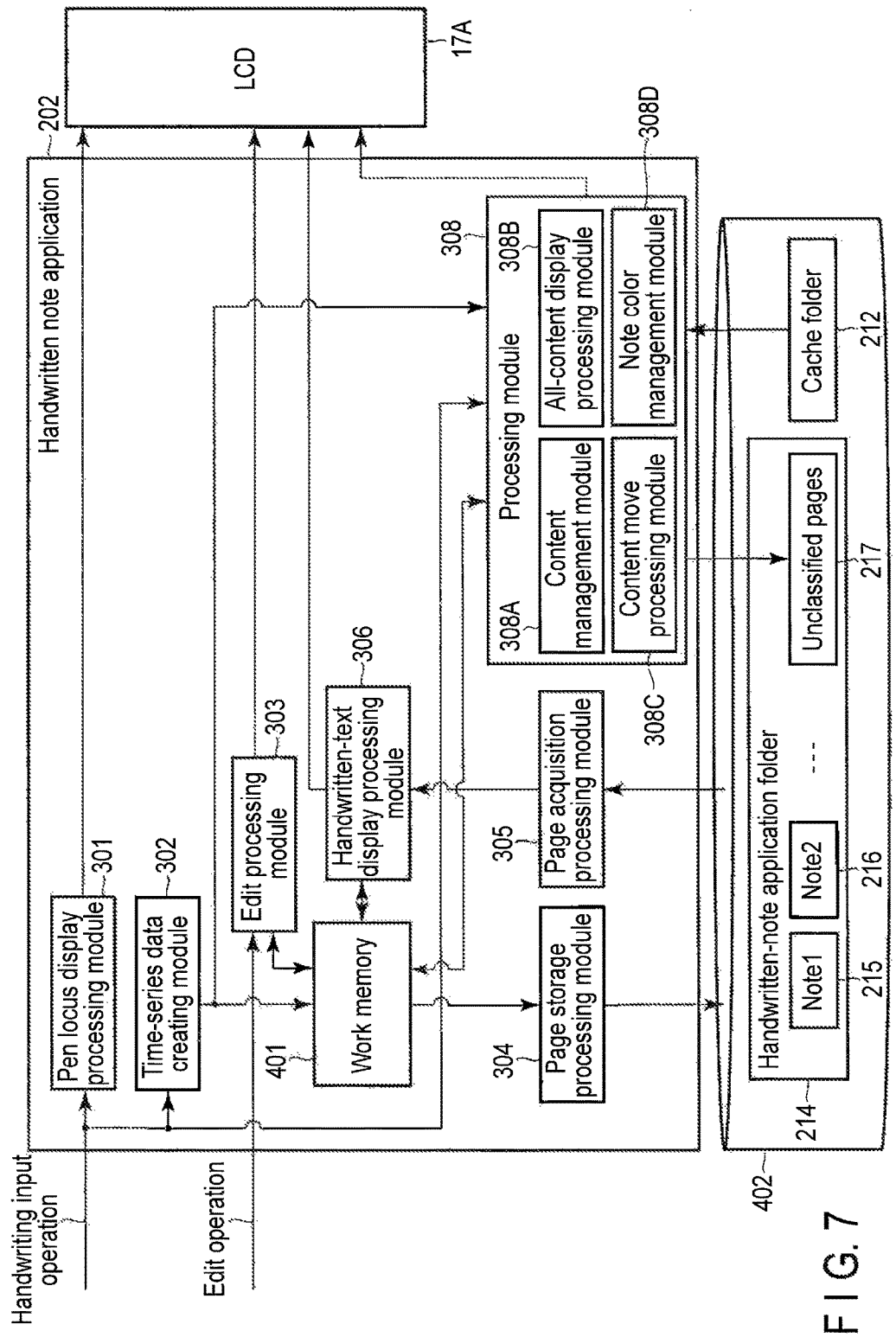
FIG. 7 is an exemplary block diagram showing a functional configuration of a handwritten note application program which is executed by the electronic apparatus as shown in FIG. 1.

Next, the structure of the handwritten note application program 202 will be explained with reference to FIG. 7.

The handwritten note application program 202 comprises a pen locus display processing module 301, time-series data creating module 302, an edit processing module 303, a page storage processing module 304, a page acquisition processing module 305, a handwritten document display processing module 306, a processing module 308, etc. The handwritten notebook application program 202 executes creation, displaying, edit, etc., of a handwritten document (handwriting data) using stroke data which is input using the touch screen display 17. The touch screen display 17 is configured to detect occurrence of an event such as "touch", "move (slide)", or "release". "Touch" is an event indicating that an external object has come into contact with the screen. "Move (slide)" is an event indicating that the contact position has been moved while the external object is in contact with the screen. "Release" is an event indicating that the external object has been separated from the screen.

The pen locus display processing module 301 and the time-series data creating module 302 receive the event "touch" or "move (slide) issued by the touch screen display 17 to thereby detect a handwriting input operation. The "touch" event includes the coordinates of the contact position. Also, the "move (slide)" event includes the coordinates of the contact position of the destination of the move. Therefore, the pen locus display processing module 301 and the time-series data creating module 302 can receive from the touch screen display 17 a coordinate string corresponding to the locus of movement of the contact position.

The pen locus display processing module 301 functions as a display processing module configured to display on the screen of the touch screen display 17, handwriting (one or more strokes) which is input by a handwriting input operation. The pen locus display processing module 301 receives a series of coordinates from the touchscreen display 17. On the basis of the received coordinates, the pen locus display processing module 301 displays a plurality of strokes input by handwriting with the pen 100, etc., on the screen of the LCD 17A of the touchscreen display 17. The pen locus display processing module 301 can execute various display controls of displaying of a user interface (UI) under the control of the processing module 308.

The time-series data creating module 302 receives the above coordinates output from the touch screen display 17. Based on the coordinates, the time-series data creating module 302 creates a plurality of stroke data items (time-series data) corresponding to the above plurality of strokes. Those stroke data items may be temporarily stored in a work memory 401, i.e., coordinate data indicating the coordinates of each of points on each of the strokes and time stamp information of each stroke may be temporarily stored in the work memory 401.

The page storage processing module 304 saves into the storage memory 402, handwritten document data (page) including the plurality of stroke data items corresponding to the plurality of strokes. The storage medium 402, as described above, may be any of a storage device in the tablet computer 10, a storage device in the personal computer 1 and a storage device in the server 2.

The page acquisition processing module 305 reads arbitrary handwritten document data (page) from the storage medium 402. The read handwritten document data is sent to the handwritten document display processing module 306. The handwritten document display processing module 306 analyzes the handwritten document data, and based on the result of this analysis, displays, on the screen, a plurality of strokes indicated by a plurality of stroke data items in the handwritten document data.

The edit processing module 303 executes processing for editing a page being currently displayed. To be more specific, the edit processing module 303 executes edit processing for, for example, deleting or moving one or more of a plurality of strokes being displayed, in accordance with an edit operation by the user on the touch screen display 17. Furthermore, the edit processing module 303 updates the handwritten document to reflect the result of the edit processing into the handwritten document being current displayed.

The user can erase an arbitrary one of the displayed strokes by using the "eraser" tool or the like. In addition, the user can select an arbitrary portion in the displayed handwriting page by using the "range selection" tool for enclosing an arbitrary portion on the screen in a rectangular or free frame.

The processing module 308 can execute various processing including the above auto-complete processing, search, and all-content listing. The processing module 308 includes a content management module 308A, an all-content display processing module 308B, a content moving processing module 308C, a note color management module 308D, etc.

The content management module 308A manages a plurality of pages (handwritten pages), and also manages contents created by other application programs at the same level as it manages the pages. The content management module 308A receives contents from the storage medium 402. The storage medium 402, as described above, may be any of a storage device in the tablet computer 10, a storage device in the personal computer 1 and a storage device in the server 2.

The content management module 308A acquires contents from the cache folder 212 stored in the storage medium 402, and saves into the handwritten-note application folder 214, the acquired contents as contents in Unclassified Note 217.

Of all kinds of contents including handwritten pages and contents created by the other application programs, a plurality of kinds of contents created in a given time period (first time period) are displayed by the all-content display processing module 308B, on a time-series basis, in a specific display area in the all-content listing view. The plurality of kinds of contents created in the given time period (first time period) mean a group of contents each of which was created (or modified) in a date and time falling within the given time period (first time period). Also, displaying of contents on a time-series basis means that the contents are displayed such that the contents are arranged in the order (chronological order) in which the contents were created (or modified).

In accordance with a user's operation, the content moving processing module 308C moves pages or contents created by the other application programs between notes (User Created Note 215, 216 and Unclassified Note 217). The note color management module 308D sets colors (theme colors) to the notes (User Created Note 215, 216 and Unclassified Note 217), respectively. In the all-content listing view, each of pages or each of contents is displayed in the color of a note to which each of pages or each of contents belongs.

Next, some user interfaces provided by the handwritten note application program 202 will be explained.

Figure 8:
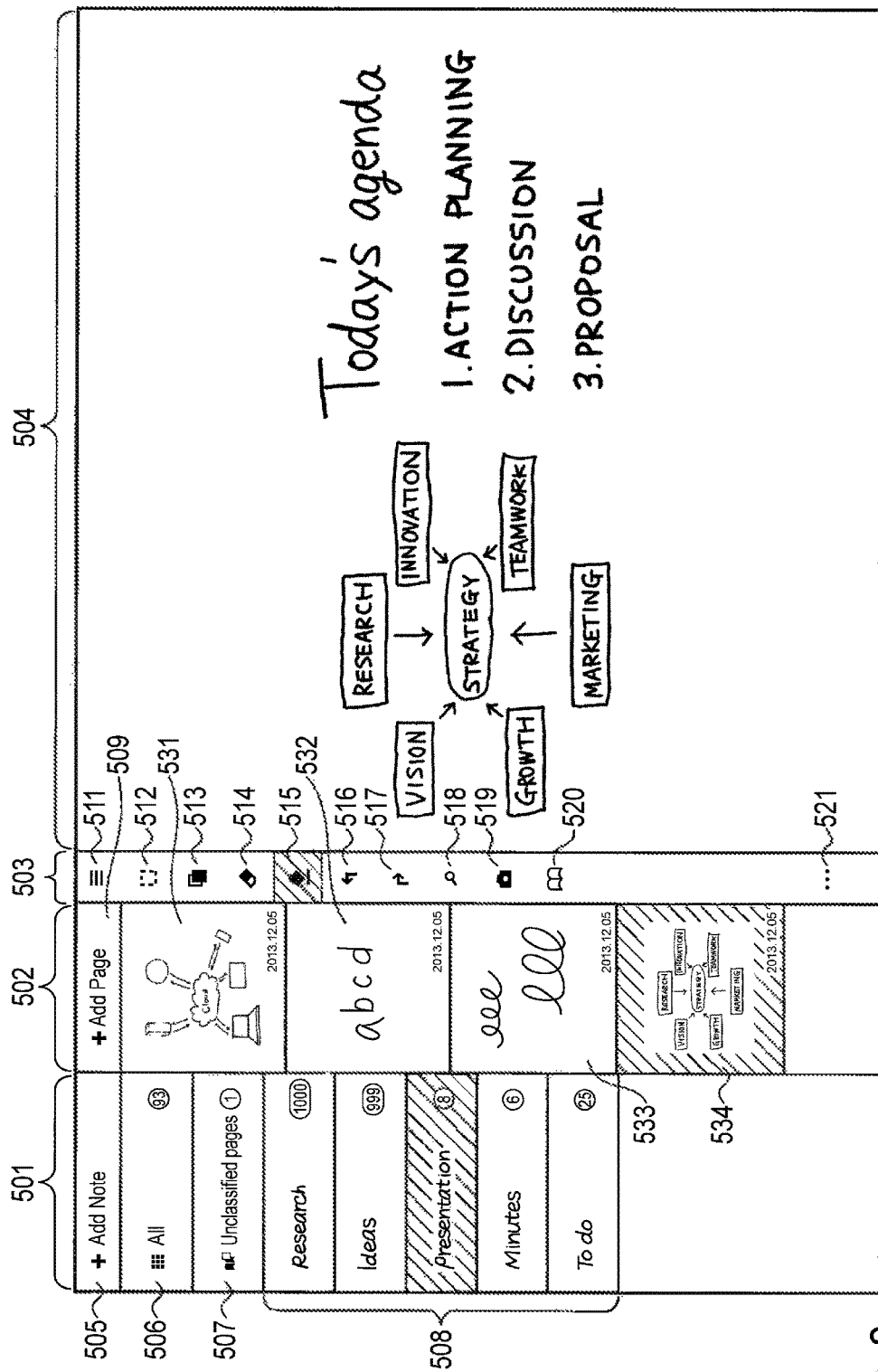
FIG. 8 is an exemplary view showing an edit view (edit screen) displayed by the electronic apparatus as shown in FIG. 1.

FIG. 8 shows an edit view (edit screen).

The processing module 308 displays such an edit view as shown in FIG. 8. The edit view is a user interface (UI) which includes four areas, i.e., a notebook list 501, a page list 502, an edit tool bar 503, and an edit view area 504. The areas 501 to 504 are arranged in this order from a left end of the screen of the tablet computer 10 toward a right end of the screen. The user can operate the user interface (UI) using a pen, a finger, a mouse or a keyboard. The following explanation is largely given with respect to the case where the UI is operated by a pen or finger gesture (tap, swipe or the like), although the gesture for operating the UI is not limited to the pen or finger gesture.

The notebook list 501 indicates a list of notes (notebooks) which are managed by the handwritten note application program 202. "Add Note" icon 501 and "All" icon 506 located close to an upper end of the notebook list 501 are command icons. When the user taps "Add Note" icon 505, the processing module 308 executes processing for adding a new note. When the user taps "All" icon 506, the processing module 308 executes processing for displaying a list of thumbnails associated with all contents in all notes (i.e., all pages, and all contents created by other applications) on the all-content listing view.

"Unclassified pages" icon 507 is a note icon indicating a note ("Unclassified pages" note) in which a group of contents created by the other applications are to be registered. Also, a group of handwritten pages which do not belong to any of notes created by the user may be registered in the "Unclassified Pages" note.

A group of "User Created Note" icons 508 indicate a list of notes created by the user. Referring to FIG. 8, the "User Created Note" icons 508 include a "Research" icon, an "Ideas" icon, a "Presentation" icon, a "Minutes" icon and a "To Do" icon.

The "Research" icon is a note icon indicating a note (titled "Research") of the user. The "Ideas" icon is a note icon indicating a note (titled "Ideas") of the user. The "Presentation" icon is a note icon indicating a note (titled "Presentation") of the user. The "Minutes" icon is a note icon indicating a note (titled "Minutes") of the user. The "To Do" icon is a note icon indicating a note (titled "To Do") of the user.

Those note icons can be re-arranged by a drag-and-drop operation.

"Unclassified Pages" icon 507 indicates a number which represents the number of contents included in the "Unclassified Pages" note. As the number, the number of contents newly registered in the "Unclassified Pages" note (the number of contents newly acquired from the other applications) may be indicated. When the user selects "Unclassified Pages" icon 507 to view contents in the "Unclassified Pages" note, the above number may be changed to the number of all contents included in the "Unclassified Pages" note. After viewing of the contents in the "Unclassified Pages" note has been completed, as the above number, the number of contents newly registered in the "Unclassified Pages" note after one-previous viewing of the "Unclassified Pages" note may be indicated.

Each of "User Created Note" icons 508 indicates the number of contents (handwritten pages) included in an associated note.

The page list 502 indicates a list of thumbnails associated with pages (including contents created the other application program) included in a note associated with a currently selected note icon.

"Add Page" icon 509 located at an uppermost part of the page list 502 is a command icon. When the user taps "Add Page" icon 509, the processing module 308 executes processing for adding a new page to a page being edited.

Under "Add Page" icon 509, a plurality of page icons 531 to 534 representing respective thumbnails corresponding to the plurality of pages are arranged. A page (or content created by another application program) corresponding to a selected page icon is displayed in an edit view area 504. The user can cause an arbitrary page (or arbitrary content created by the other application program) to be displayed in the edit view area 504, by selecting an arbitrary page icon in the page list 502.

An edit tool bar 503 includes several buttons for editing pages (or the contents created by the other applications). "Edit full-screen" button 511 is a button for causing the edit view area 504 to be displayed in a full-screen mode. When "edit full-screen" button 511 is tapped, the notebook list 501 and the page list 502 disappear from the screen, the edit view area 504 is enlarged, and the edit tool bar 503 is moved to a left end of the screen. "Selection pen (range selection)" button 512 is used as a "range selection" tool. The user can select one or more objects in the edit view area 504, using the "selection pen". When the user taps "selection pen" button 512, the processing module 308 may display a menu for changing a selection type (Rectangle/Free Frame/Select All).

"Paste" button 513 is a button for pasting an object stored in the clip board to the page being edited. "Eraser pen" button 514 is used as an "eraser" tool. The user can erase one or more strokes in the edit view area 504 with an "eraser pen". When the user taps "Eraser pen" button 514, the processing module 308 may display a menu for changing an eraser size (Large/Small/Entire Page).

"Stroke input pen" button 515 is used to draw a stroke. The user can draw a stroke in the edit view area 504 with a "stroke input" pen. When the user taps "stroke input pen" button 515, the processing module 308 may display a menu indicating some preset pens. Each of the preset pens is defined with respect to a combination of, for example, pen type (fountain pen/pencil/ball-point pen/highlighter (marker)/felt pen), width, color, and transparency. The user can select a pen from the menu.

"Undo" button 516 is used to undo an edit operation. "Redo" button 517 is used to redo the edit operation.

"Search" button 518 is a button for executing the above handwriting search or text search. "Camera" button 519 is used to take a picture (photo) such as document image, and import the picture (photo) to the edit view area 504. When the "camera" button 519 is tapped, the processing module 308 launches the capture application program 203. The user can take a picture (photo) using the capture application program 203. The capture application program 203 captures an image (e.g., picture such as document image) by using the camera 111 and corrects the image. The image data (document image) of the picture which is taken and corrected by the capture application program 203 is imported (pasted) to the page being edited. "Preview" button 520 is a button for entering a preview mode in which all pages in a note including the page being edited can be each viewed. "Menu bar" button 521 is a button for displaying a menu which differs from the edit tool bar 503.

The edit view area 504 is a handwriting input area in which a handwriting input operation can be performed.

Figure 9:
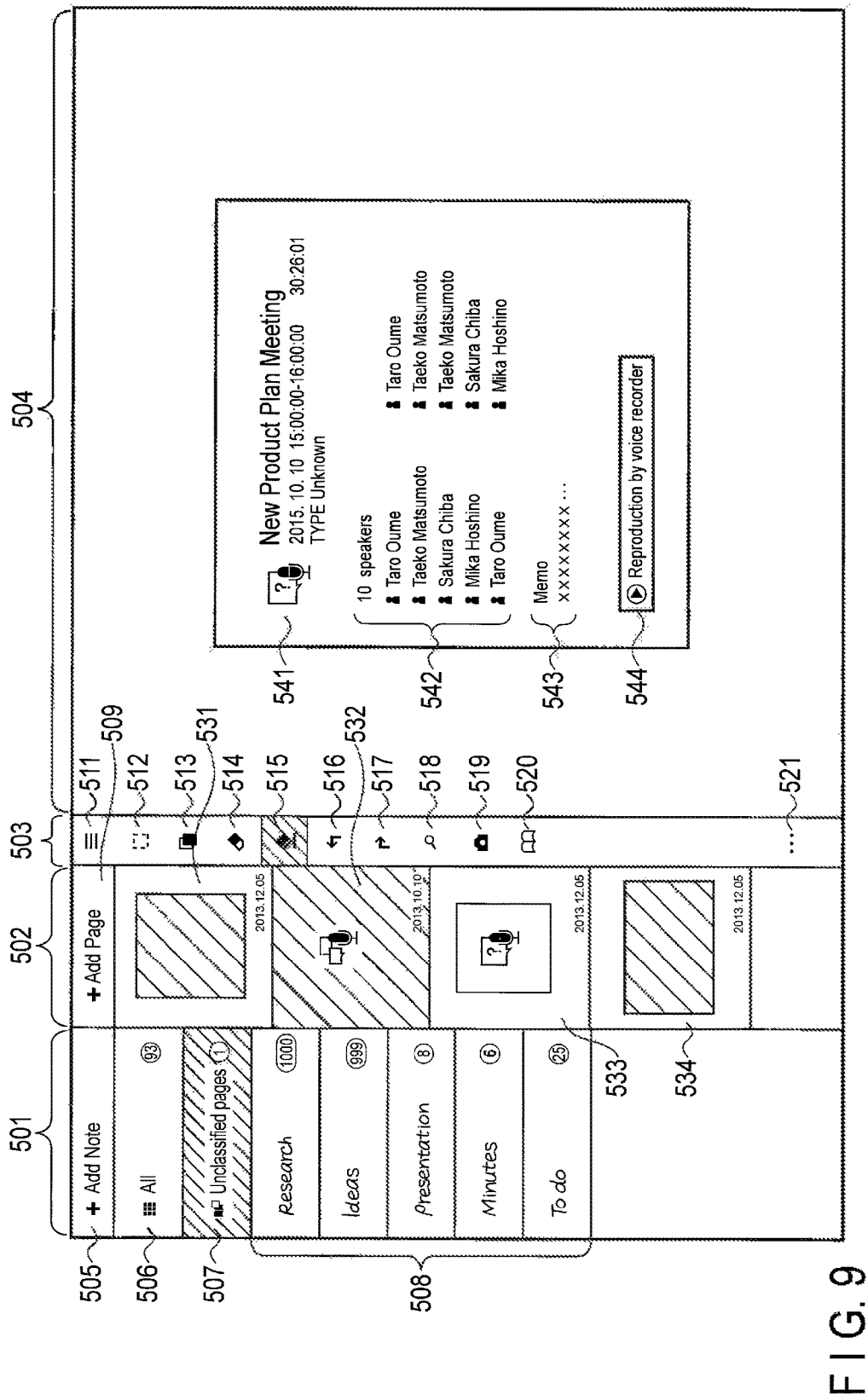
FIG. 9 is a view showing an example of data (content) of a voice recorder application displayed on the edit view as shown in FIG. 8.

FIG. 9 shows an example of data (content) of the voice recorder application program 204.

When "Unclassified Pages" icon 507 is tapped, thumbnails of pages (contents) in "Unclassified pages" are displayed in the page list 502. Each of contents created by the voice recorder application program 204 is metadata of recording data of voice. When the user taps the thumbnail 532 of the content (metadata) of the voice recorder application program 204, details of the content (metadata) are displayed in the edit view area 504.

The details of the metadata include four items 541 to 545. The item 541 includes: an icon corresponding to the kind (a voice memo, recording of a conference, indistinct recording or the like) of recording data; the title ("New Product Plan Meeting") of the recording data; the date and time ("2015. 10.10 15:00:00-16:00:00") at which the data was recorded; and the total time length (30:26:01) of the recording data, etc. Item 542 represents a list of speakers in the recording data. Item 543 represents a text (memo) added by the user. Item 544 is a reproduction button for requesting reproduction (i.e., playback) of the recording data with the voice recorder application program 204.

Figure 10:
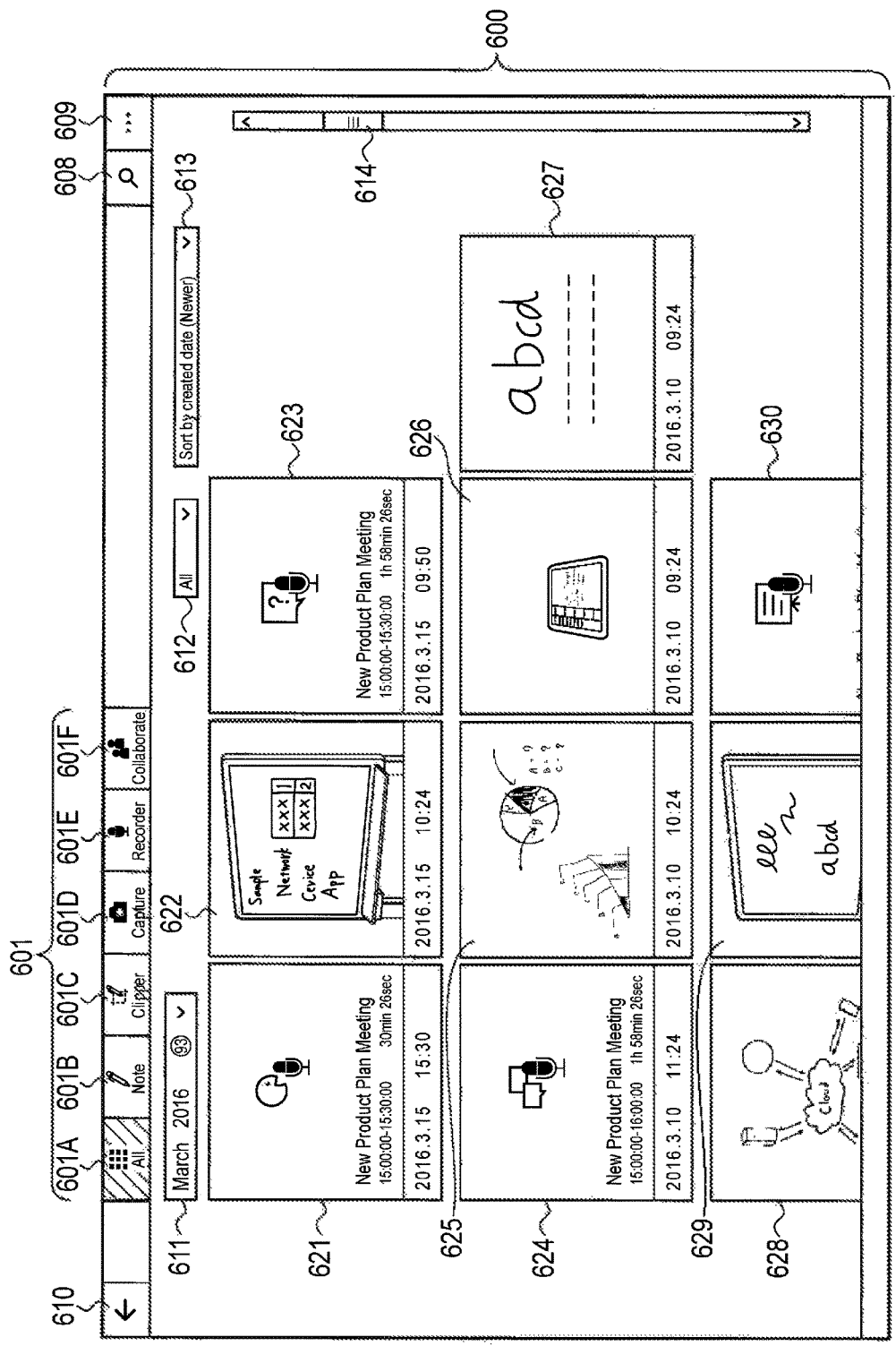
FIG. 10 is a view showing an all-content list view (all-content list screen) displayed by the electronic apparatus as shown in FIG. 1.

FIG. 10 shows an example of an all-content list view (all-content list screen).

When "All" icon 506 in an edit view is tapped, the processing module 308 displays such an all-content listing view as shown in FIG. 10.

In the all-content list view 600, a list of all contents 621 to 623, contents 624 to 627, contents 628 to 630, . . . , which include handwritten pages and contents created by other application programs, are displayed. In this case, a list of thumbnails of those contents may be displayed in the all-content list view 600. For example, thumbnails of the handwritten pages are images of handwriting in the pages.

Those contents are sorted from oldest to newest or from newest to oldest. In either from newest to oldest or from newest to oldest, contents created in the same time period (for example, on the same day) are displayed on a time-series basis (from oldest to newest or vice versa) in a display area formed in the shape of a band extending in either a lateral direction (row direction) or a vertical direction (column direction).

For example, the contents created in the same time period (for example, on the same day) may be displayed on a certain display area extending in the row direction in a chronological order.

In this case, in the case where contents 621 to 623, contents 624 to 627, contents 628 to 630, . . . , are displayed as a list, first, those contents are sorted in accordance with the dates and times at which these contents were created, and are arranged in a chronological order on the all-content list view 600. Some contents created (or updated) on the same day are successively arranged in the same display area from the left end to the right end thereof. If the creation date and time of a content to be displayed subsequently is different from that of the content precedent to the content to be displayed subsequently, a display area for use in displaying the content to be displayed subsequently is changed from a currently used display area to a display area on a subsequent row. The display area on the subsequent row extends in parallel to the current-used display area.

Therefore, plural contents created in different time periods (for example, on different days) are not displayed in the same display area.

Thumbnails of those contents may include tag areas indicating the dates and times at which these contents were created (modified). Those tag areas may be located under the thumbnails. Also, the thumbnails of those contents are displayed in the colors of associated notes, respectively. For example, only a tag area indicating the date and time at which content was created (or modified) may be displayed in the color of an associated note, or the entire thumbnail may be displayed in the color of the associated note. Alternatively, only when a given thumbnail is selected, the entire thumbnail may be highlighted in the color of the associated note.

Three contents 621 to 623 are a group of contents created (or modified) on a given day (for example, Mar. 15, 2016). Contents 621 and 623 are contents created by the voice recorder application program 204. Content 622 is content created by the capture application program 203. Those three contents, i.e., contents 621 to 623, are arranged in the lateral direction from oldest to newest or vice versa. The maximum number of contents to be displayable in a single display area is, for example, 4. In the case where the number of contents created (or modified) on the same day (for example, Mar. 15, 2016) is 6, the fifth and sixth ones of those contents may be displayed in turn from the left end of the display area in a subsequent row.

Four contents 624 to 627 are a group of contents created (or modified) on another day (for example, Mar. 10, 2016). Content 624 is content created by the voice recorder application program 204. Contents 625 and 627 are contents (handwritten pages) created by the handwritten-note application program 202. Content 626 is content created by the voice recorder application program 204. Those four contents, i.e., contents 624 to 627, are arranged in the lateral direction from oldest to newest or vice versa.

Also, contents 628 to 630 are a group of contents created (or modified) on another day.

The all-content list view 600 can be scrolled in the vertical direction.

In the all-content list view 600, of contents created by a plurality of application programs, contents created (or modified) on the same time period (for example, on the same day) are displayed in a chronological order on the same display area. Therefore, plural contents having a high relevance in time are arranged adjacent to each other in the same display area.

In other word, in the all-content list view 600, the contents (thumbnails of the contents) 621 to 630 are arranged two-dimensionally according to a first direction (e.g., vertical direction) and a second direction (e.g., lateral direction)

perpendicular to the first direction. The first direction represents a chronological order. Tat is, the contents (thumbnails) 621 to 630 are arranged in a chronological order with respect to the first direction (e.g., vertical direction). The contents (thumbnails) 621 to 623 are arranged in accordance with a certain position on the first direction, and the contents (thumbnails) 624 to 627 are arranged in accordance with another position on the first axis which may be adjacent to the certain position. The contents (thumbnails) 621 to 623 are arranged along the second direction (e.g., lateral direction), and the contents (thumbnails) 624 to 627 are arranged along the second direction.

For example, it is supposed that a first content created by a certain application (one of applications 202 to 206) in a first time period, a second content created by another application (another one of applications 202 to 206) in the first time period, a third content created by the certain application in a second time period after the first time period, and a fourth content created by said another application in the second time period are in the storage medium 402.

The processing module 308 displays a first thumbnail of the first content, a second thumbnail of the second content, a third thumbnail of the third content and a fourth thumbnail of the fourth content on the all-content list view 600.

The first to fourth thumbnails are arranged two-dimensionally, and are arranged in a chronological order with respect to the first direction (e.g., vertical direction). Both the first and second thumbnails are arranged in accordance with a certain position (e.g., a certain row position) on the first direction. Both the third and fourth thumbnails are arranged in accordance with another position (e.g., another row position) on the first direction. The first and second thumbnails are arranged along a second direction (e.g., lateral direction) perpendicular to the first direction. The third and fourth thumbnails are arranged along the second direction.

As described above, in a business situation such as a conference, there is a case where while taking a note by a handwriting operation, voice made in the conference is recorded, or a paper material or an image on a whiteboard is captured. Ordinarily, a handwritten page, recording data of voice and a photo (image data) are individually managed by different application programs. In the present embodiment, the handwritten note application program 202 can manage not only a handwritten page, but all contents including a handwritten page, recording data of voice and a photo (image data), and display a group of contents created in the same time period in a chronological order on the same display area. It is therefore possible to present the relevance between the handwritten page, the recording data of voice and the photo (image data) to the user in such a manner as to enable the user to easily understand the relevance.

In the all-content list view 600, the following are further displayed: a group of "filtering" buttons 601; "search" button 608; "menu bar" button 609; "return" button 610; "month jump" pull-down menu 611; "All" pull-down menu 612 and "sort" pull-down menu 613.

The group of "filtering" buttons 601 includes "All Filtering" button 601A, "Note Filtering" button 601B, "Clipper Filtering" button 601C, "Capture Filtering" button 601D, "Recorder Filtering" button 601E, and "Collaboration Filtering" button 601F.

"All Filtering" button 601A is a button for displaying a list of all kinds of contents of a plurality of kinds of application programs (which correspond to, in this case, the handwritten note application program 202, the capture application program 203, the voice recorder application program 204, the clipper application program 205 and the collaboration application program 206). In an initial state, "All Filtering" button 601A is set in an effective state.

The "Note Filtering" button 601B is a button for displaying only a list of handwritten pages created by the handwritten note application program 202, on the all-content list view 600. When the user taps "Note Filtering" button 601B, the processing module 308 extracts handwritten pages created by the handwritten note application program 202 from all contents, and displays the handwritten pages created by the handwritten note application program 202 as a list on the all-content list view 600. A group of content created (modified) by the handwritten note application program 202 on the same day is displayed in a chronological order on the same display area.

For example, when the user selects the handwritten note application program 202 by tapping "Note Filtering" button 601B, while content 624 to 627 created on Mar. 10, 2016 are being displayed in the same display area (display row) as shown in FIG. 10, the processing module 308 displays only the content 625 and 627 of the content 624 to 627, which are handwritten pages, from the left end of the display area.

"Clipper Filtering" button 601C is a button for displaying only a list of contents created by the clipper application program 205 on the all-content list view 600. When the user taps "Clipper Filtering" button 601C, the processing module 308 extracts from all the contents, the contents created by the clipper application program 205, and lists the contents created by the clipper application program 205 on the all-content list view 600. A group of contents created (modified) by the clipper application program 205 on the same day is displayed in a chronological order on the same display area.

"Capture Filtering" button 601D is a button for displaying only a list of contents created by the capture application program 203 on the all-content list view 600. When the user taps "Capture Filtering" button 601D, the processing module 308 extracts from all the contents, the contents created by the capture application program 203, and lists only the contents created by the capture application program 203 on the all-content list view 600. A group of contents created (modified) by the capture application program 203 on the same day is displayed in a chronological order on the same display area.

The "Recorder Filtering" button 601E is a button for displaying only a list of contents created by the voice recorder application program 204 on the all-content list view 600. When the user taps "Recorder Filtering" button 601E, the processing module 308 extracts from all the contents, contents created by the voice recorder application program 204, and lists only the contents created by the voice recorder application program 204 on the all-content list view 600. A group of contents created (modified) by the voice recorder application program 204 on the same day is displayed in a chronological order on the same display area.

For example, in the all-content list view 600 shown in FIG. 10, the processing module 308 displays four thumbnails of the contents 621, 623, 624, and 630 on the all-content list view 600. These four thumbnails are arranged two-dimensionally, and are arranged in a chronological order with respect to along the first direction (e.g., vertical direction). The thumbnail of the content 621 and the thumbnail of the content 623 are both arranged in association with a certain position on the first direction. The thumbnail of the content 624 is arranged in association with another position adjacent to the certain position on the first direction. The thumbnail of the content 630 is arranged in association with still another position adjacent to said another position on the first direction.

The thumbnail of the content 621 and the thumbnail of the content 623 are arranged along the second direction (e.g., lateral direction) perpendicular to the first direction.

If the content 624 and other content are created by the voice recorder application program 204 in the same time period, both the thumbnail of the content 624 and the thumbnail of said other content are arranged in accordance with the same position on the first direction, and are arranged along the second direction.

When the user taps "Collaboration Filtering" button 601F, the processing module 308 lists contents created by the collaboration application program 206 on the all-content list view 600. A group of contents created (updated) by the collaboration application program 206 on the same day is displayed in a chronological order on the same display area.

The "search" button 608 is a button for searching all contents including handwritten pages and contents created by other application programs for content which matches a search key. The "menu bar" button 609 is a button for displaying a menu for, for example, deleting or moving arbitrary content on the all-content list view 600. The "return" button 610 is a button for returning the current screen to the edit view.

The "month jump" pull-down 611 is a pull-down menu for effecting jumping to a list associated with a specified "month" as a content list to be displayed on the all-content list view 600. The "All" pull-down menu 612 is a pull-down menu for limiting contents to be displayed on the all-content list view 600 to only contents included in an arbitrary one or more notes. The "sort" pull-down menu 613 is a pull-down menu for changing the order of sorting contents to be displayed on the all-content list view 600. The order of sorting defaults may be the order determined in accordance with dates and times at which contents were created. The user can change the sorting order to the order determined in accordance with dates and times at which contents were modified (updated).

Figure 11:
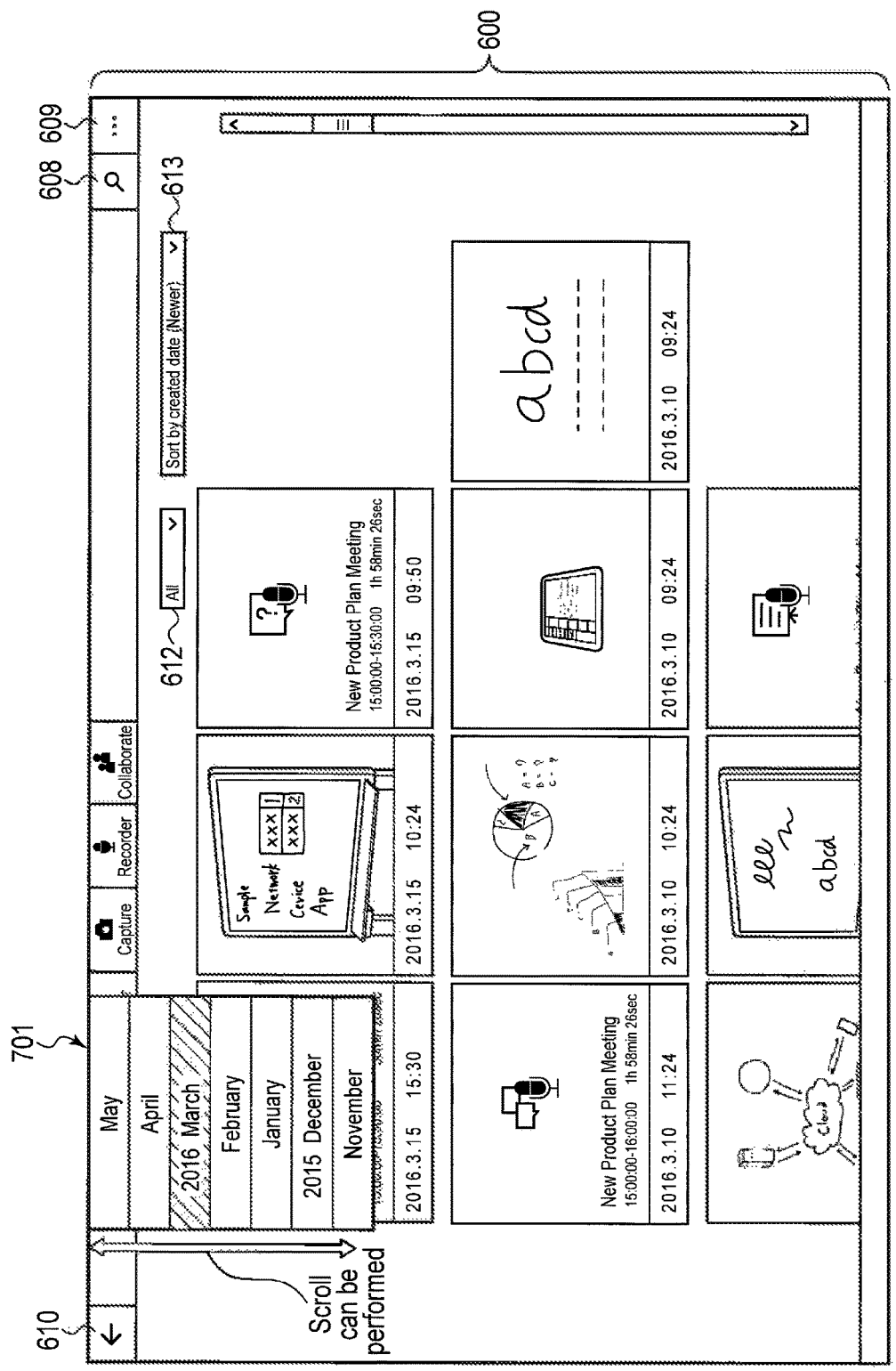
FIG. 11 is a view showing an example of a month list displayed on the all-content list view.

FIG. 11 shows an example of a month list 701 displayed on the all-content list view 600.

The month list 701 is displayed (pops up) on the all-content list view 600 when the "month jump" pull-down menu 611 is tapped. The user can scroll the month list 701. In the month list 701, the number of contents in each month may be indicated. When the user taps a given one of months indicated in the month list 701, a list of contents to be displayed on the all-content list view 600 jumps to a list of contents associated with the given month, and the month list 701 disappears. Also, when an outer area located outward of the month list 701 is tapped, the month list 701 disappears.

Figure 12:
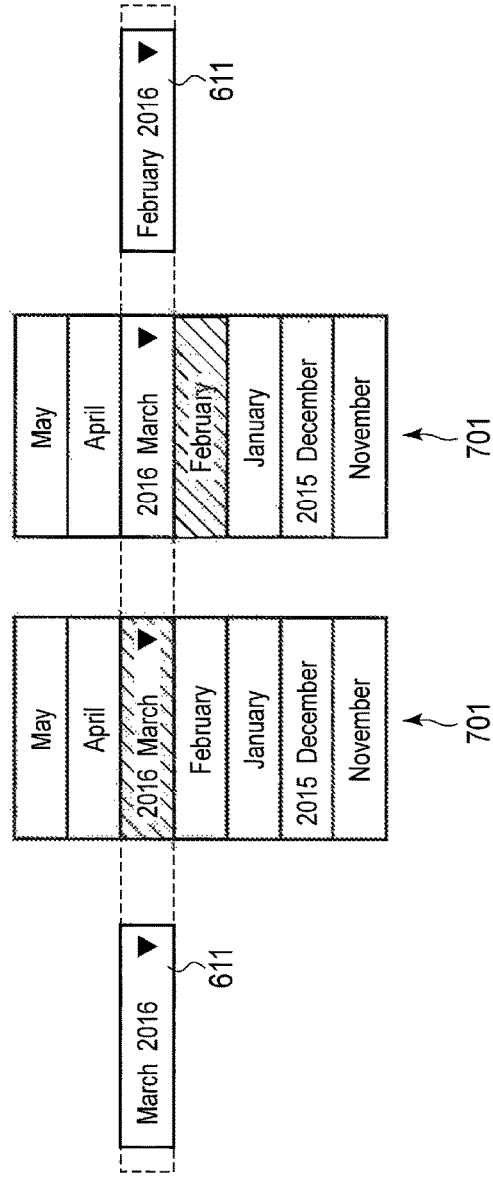
FIG. 12 is a view showing an example of a month jump which is performed using the month list as shown in FIG. 11.

FIG. 12 shows an example of a month jump which is performed using the month list as shown in FIG. 11.

When the "month jump" pull-down menu 611 is tapped, the processing module 308 opens the "month jump" pull-down menu 611 and enlarges the "month jump" pull-down menu 611 in a vertical direction. The enlarged "month jump" pull-down menu 611 is displayed as the month list 701. In addition to a currently selected month ("March 2016"), the month list 701 may indicate two consecutive months subsequent to the currently selected month and four consecutive months precedent to the currently selected month. When the user taps a given month (for example, February) in the month list 701, the processing module 308 selects this month (February), and changes a list of contents to be displayed on the all-content list view 600 from a list of contents associated with March in 2016 to a list of contents associated with February in 2016. Then, the processing module 308 restores the size of the "month jump" pull-down menu 611 to the original one thereof, and changes a character string to be indicated in the "month jump" pull-down menu 611 to "February 2016".

Figure 13:
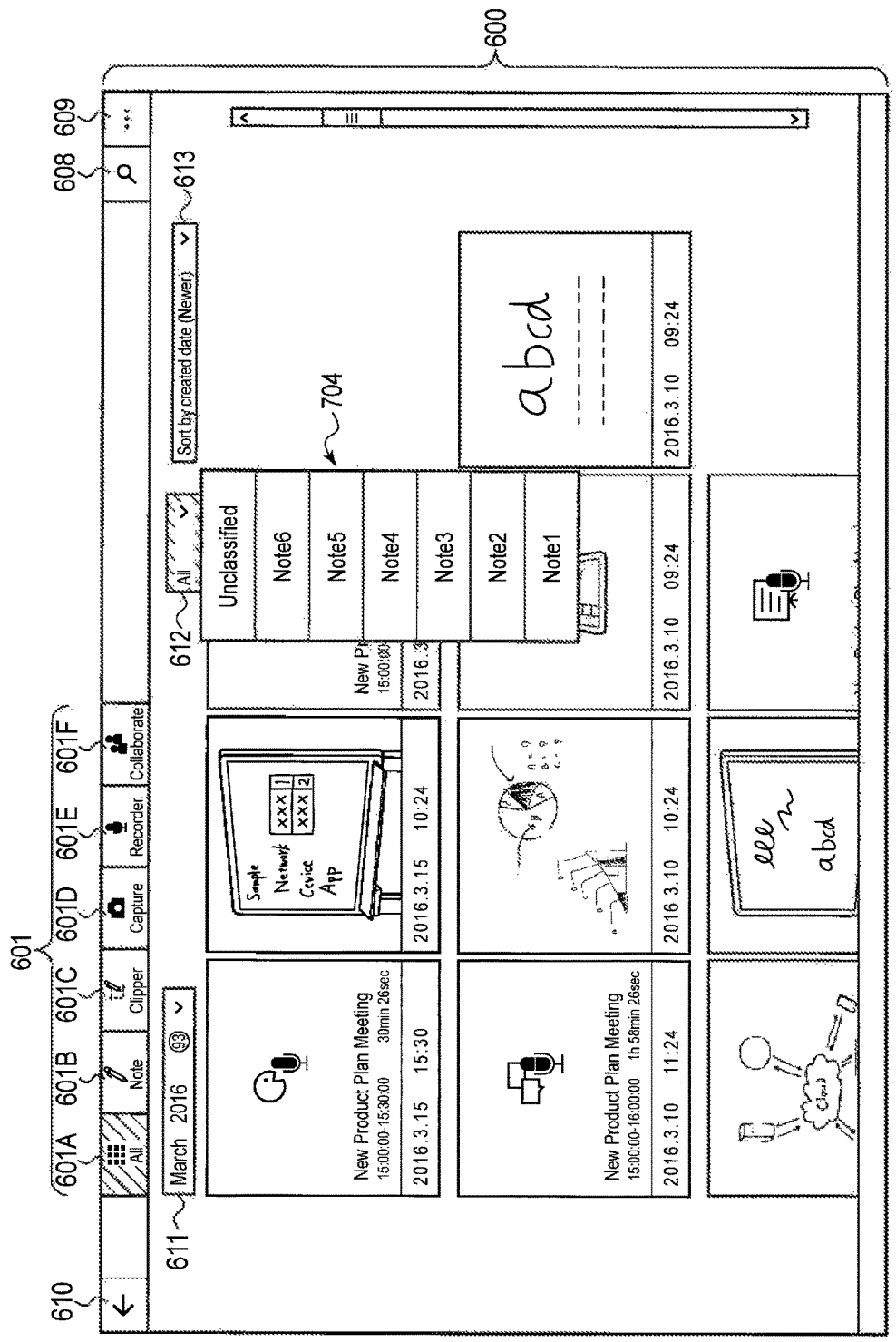
FIG. 13 is a view showing an example of a note filter displayed on the all-content list view as shown in FIG. 10.

FIG. 13 shows an example of a note filter 704 displayed on the all-content list view 600.

The note filter 704 is displayed (pops up) on the all-content list view 600 when the "All" pull-down menu 612 is tapped. The note filter 704 displays a list of all notes. When the user selects a given note, the processing module 306 extracts from all contents, only contents included in a selected note, and displays only extracted contents on the all-content list view 600.

Figure 14:
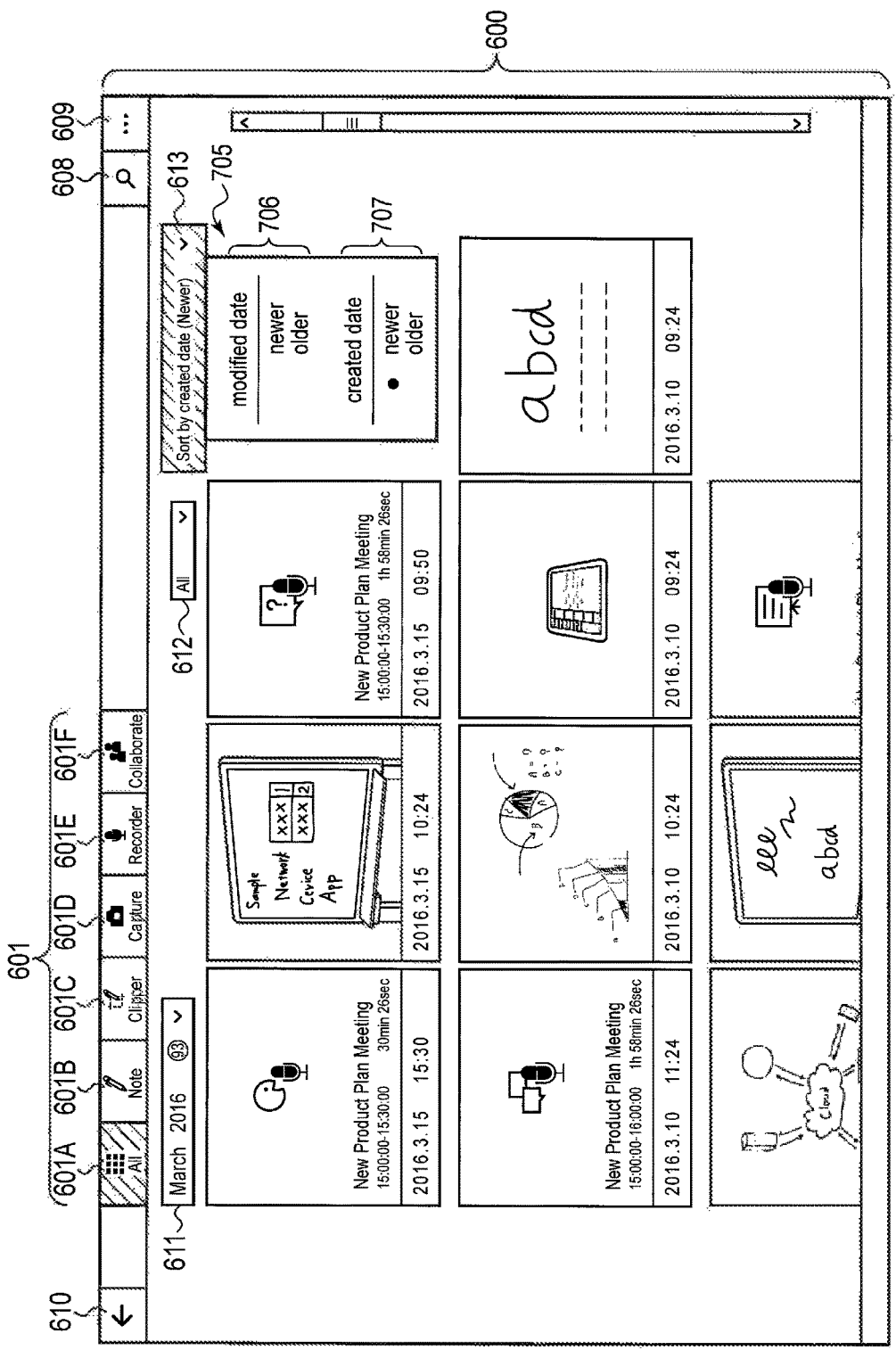
FIG. 14 is a view showing an example of a sort menu displayed on the all-content list view as shown in FIG. 10.

FIG. 14 shows an example of a sort menu 705 displayed on the all-content list view 600.

The sort menu 705 is displayed (pops up) on the all-content list view 600 when the "sort" pull-down menu 613 is tapped. In the sort menu 705, with respect to each of "Modified Date" and "Created Date", "Newer" and "Older" are displayed as such two sorting orders as described above.

When "newer" is selected as the modified date, last (newest) modified content appears at the left upper end of the content list. When "older" is selected as the modified date, first (oldest) modified content appears at the left upper end of the content list. When "newer" is selected as the created date, last (newest) created content appears at the left upper end of the content list. When "older" is selected as the created date, first (oldest) created content appears at the left upper end of the content list.

When the user selects a sorting order different from a currently used sorting order, the processing module 308 changes the currently used sorting order to the selected sorting order.

Figure 15:
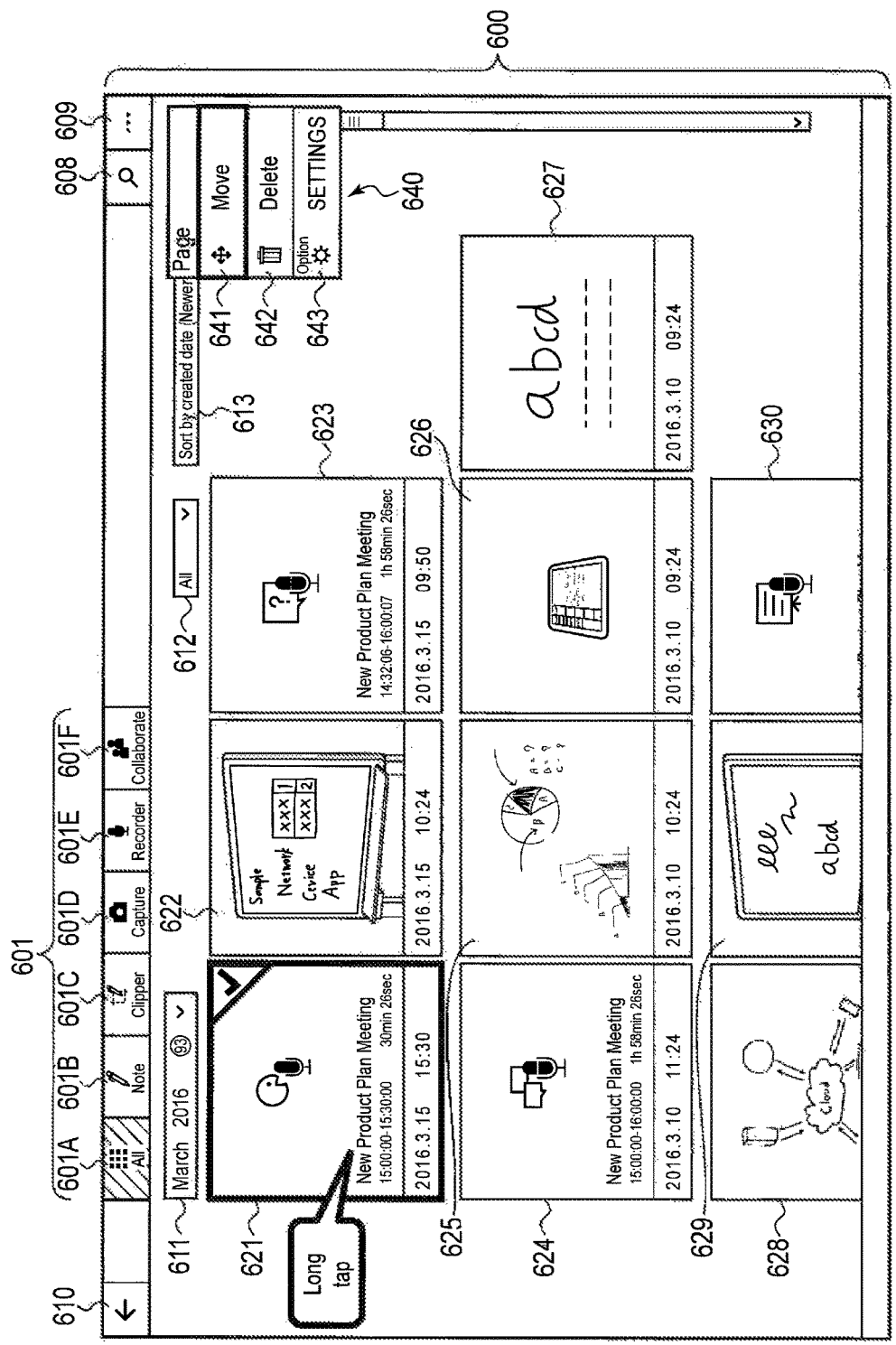
FIG. 15 is a view showing an example of a menu displayed on the all-content list view as shown in FIG. 10.

FIG. 15 shows an example of a menu 640 displayed on the all-content list view 600.

For example, when the user long taps given content on the all-content list view 600, the processing module 308 selects the content, and also causes the menu 640 to be displayed (pop up) on the all-content list view 600. Referring to FIG. 15, it is assumed that content 621 is long tapped and selected. The thumbnail of content 621 is highlighted. For example, a frame surrounding the thumbnail may be displayed.

In the menu 640, a move button 641, a delete button 642 and a setting button 643 are displayed. The move button 641 is a button for moving selected content to a note specified by the user. The delete button 642 is a button for deleting the selected content.

Figure 16:
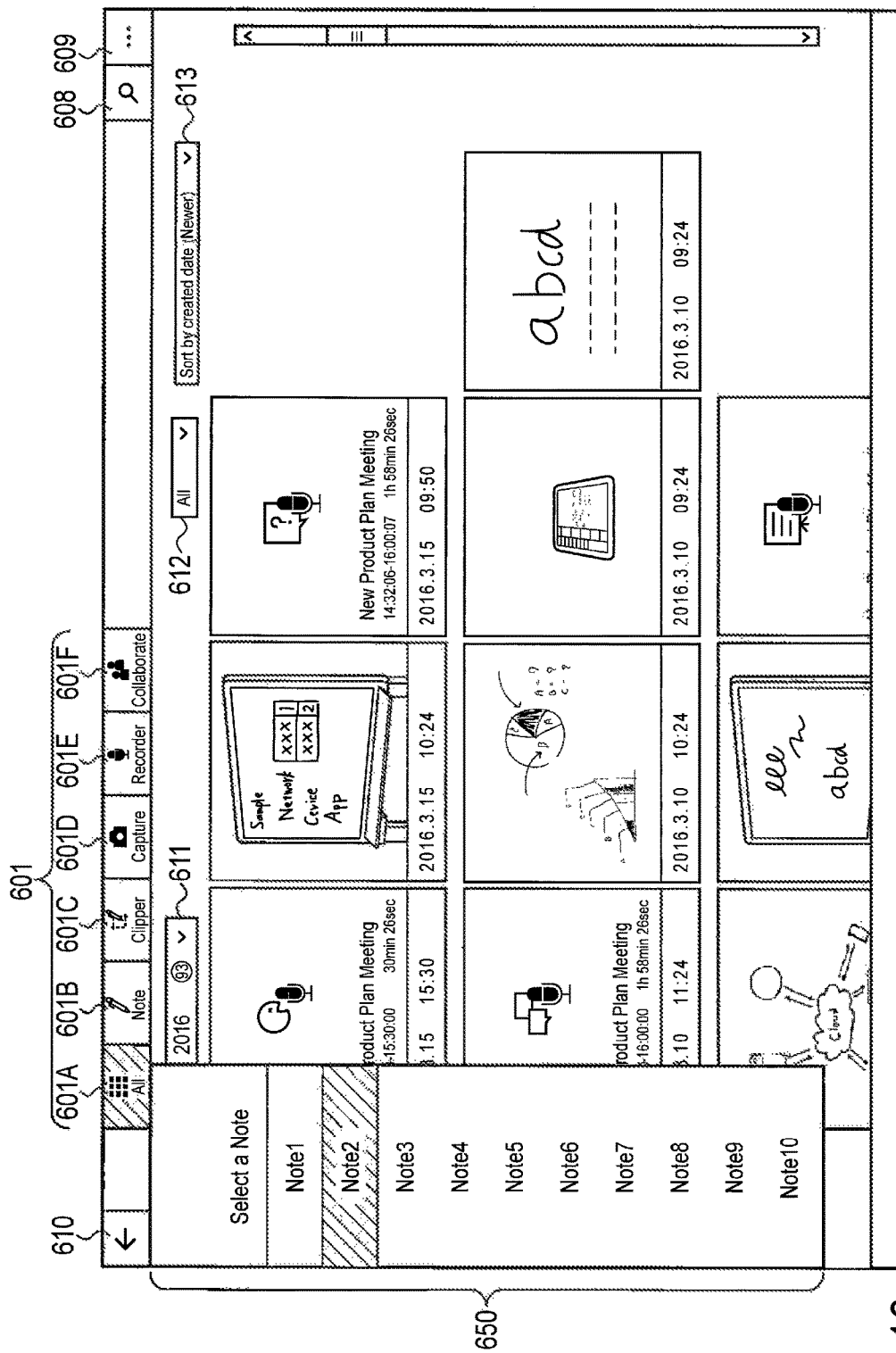
FIG. 16 is a view showing an example of a selection note list displayed on the all-content list view as shown in FIG. 10.
Figure 17:
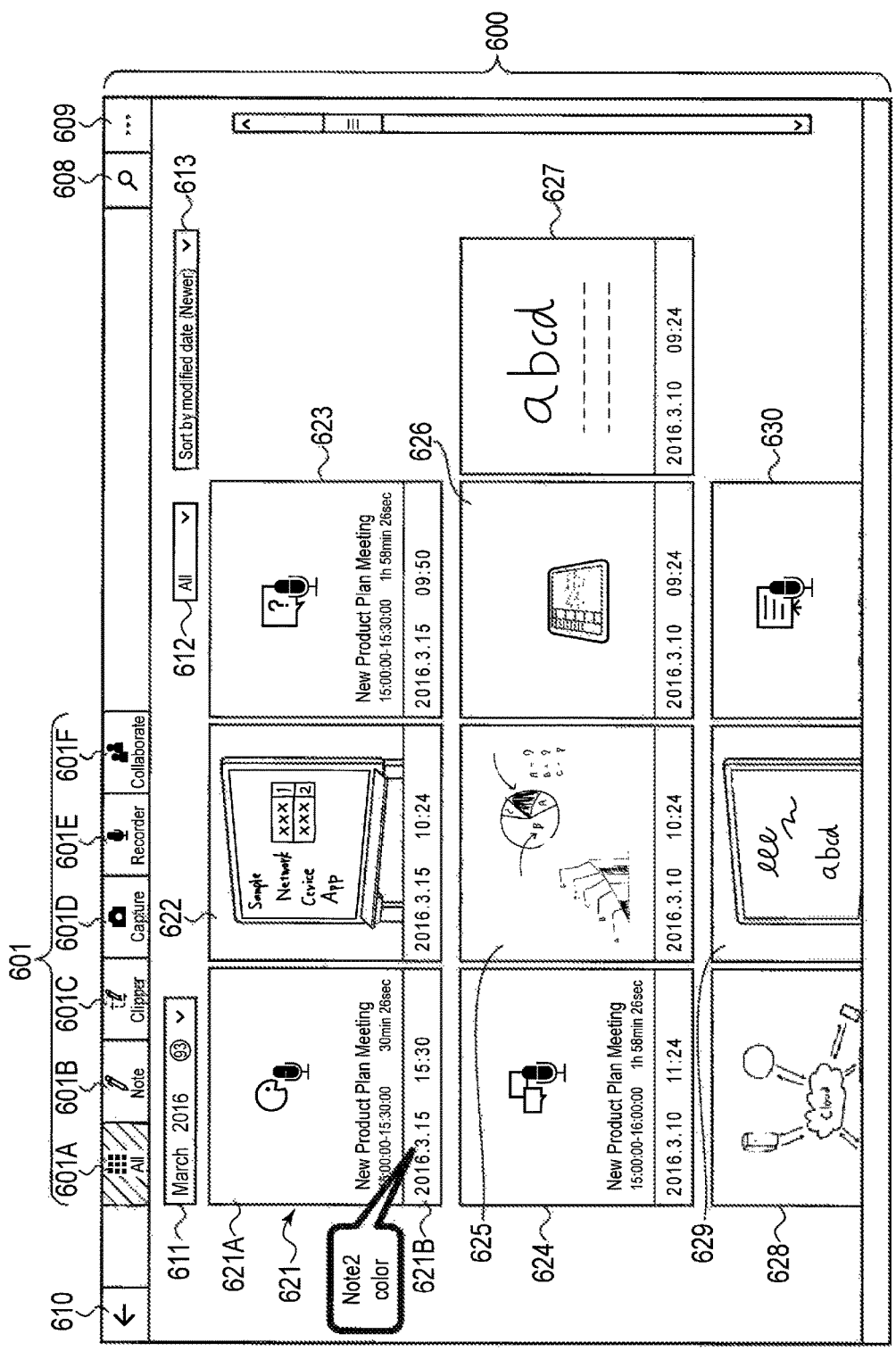
FIG. 17 is a view showing an operation for changing color of content moved to a note created by a user to color of the note.

When the user taps the move button 641, the processing module 308, as shown in FIG. 16, displays a selection note list 650 on the all-content list view 600. In the selection note list 650, all notes are listed. When the user selects a given one (destination note) of the lists in the selection note list 650, the processing module 308 highlights part of the selection note list 650 which indicates the selected note, in the color of the note. Then, the processing module 308 moves the selected content to the selected note. For example, in the case where content 621 is selected, and a note created by the user (for example, "Note 2") is selected as the destination note, the content 621 is moved from the Unclassified Note to the note created by the user (for example, "Note 2"). Then, the processing module 308, as shown in FIG. 17, causes the thumbnail of the content 621 to be displayed in color corresponding to "Note 2". In other words, the color of the thumbnail of the content 621 is changed from the color of the Unclassified Note to that of "Note 2". In this case, for example, only the color of the tag area in the thumbnail of the content 621 is changed from the color of the Unclassified Note to that of "Note 2".

Next, an operation for editing single content on the all-content list view 600 will be explained with reference to FIGS. 18 to 21.

In the following explanation, it is assumed that a handwritten stroke is added to content 626 created by the capture application program 203.

Figure 18:
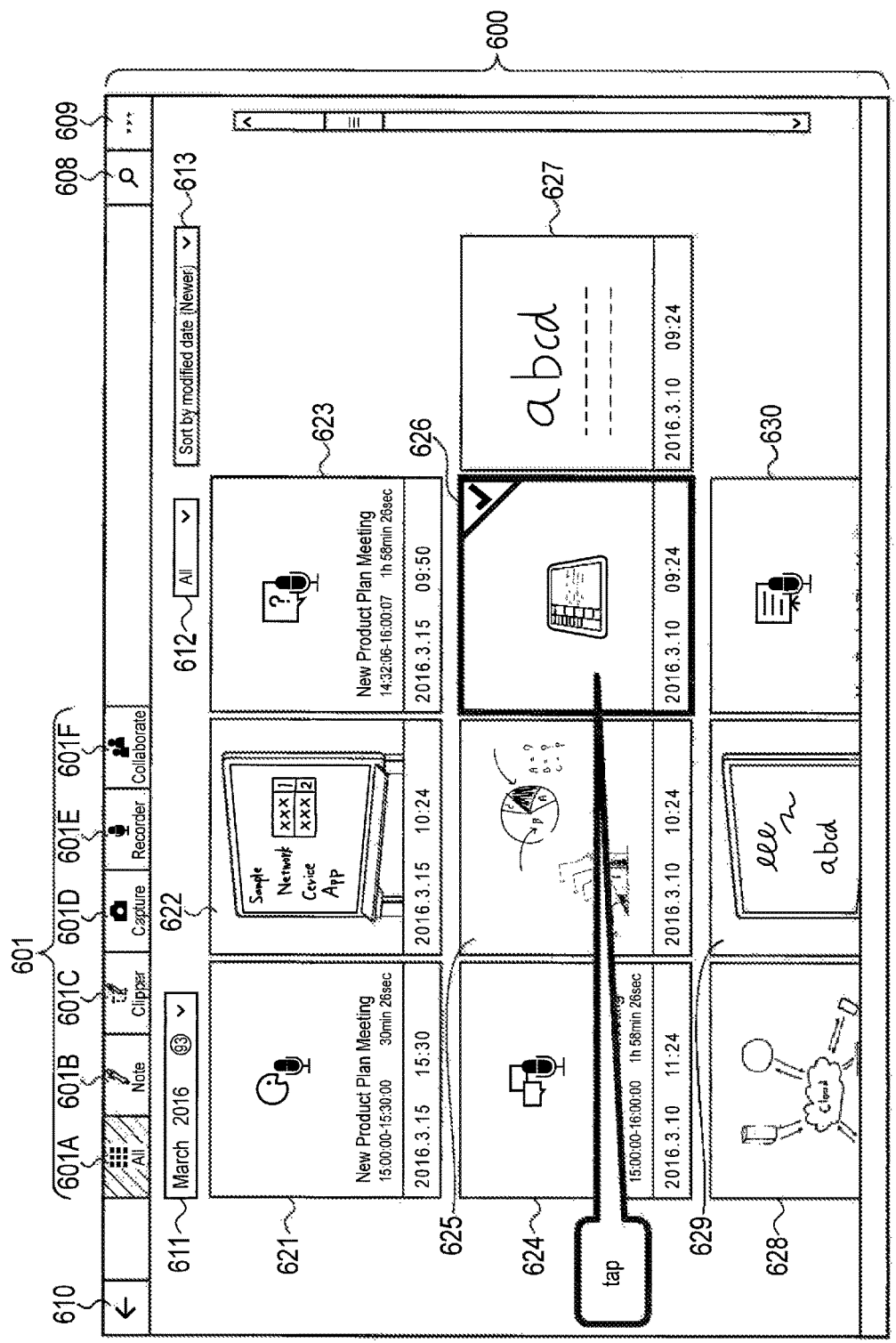
FIG. 18 is a view for explaining an operation for selecting one of plural contents on the all-content list view as shown in FIG. 10.
Figure 19:
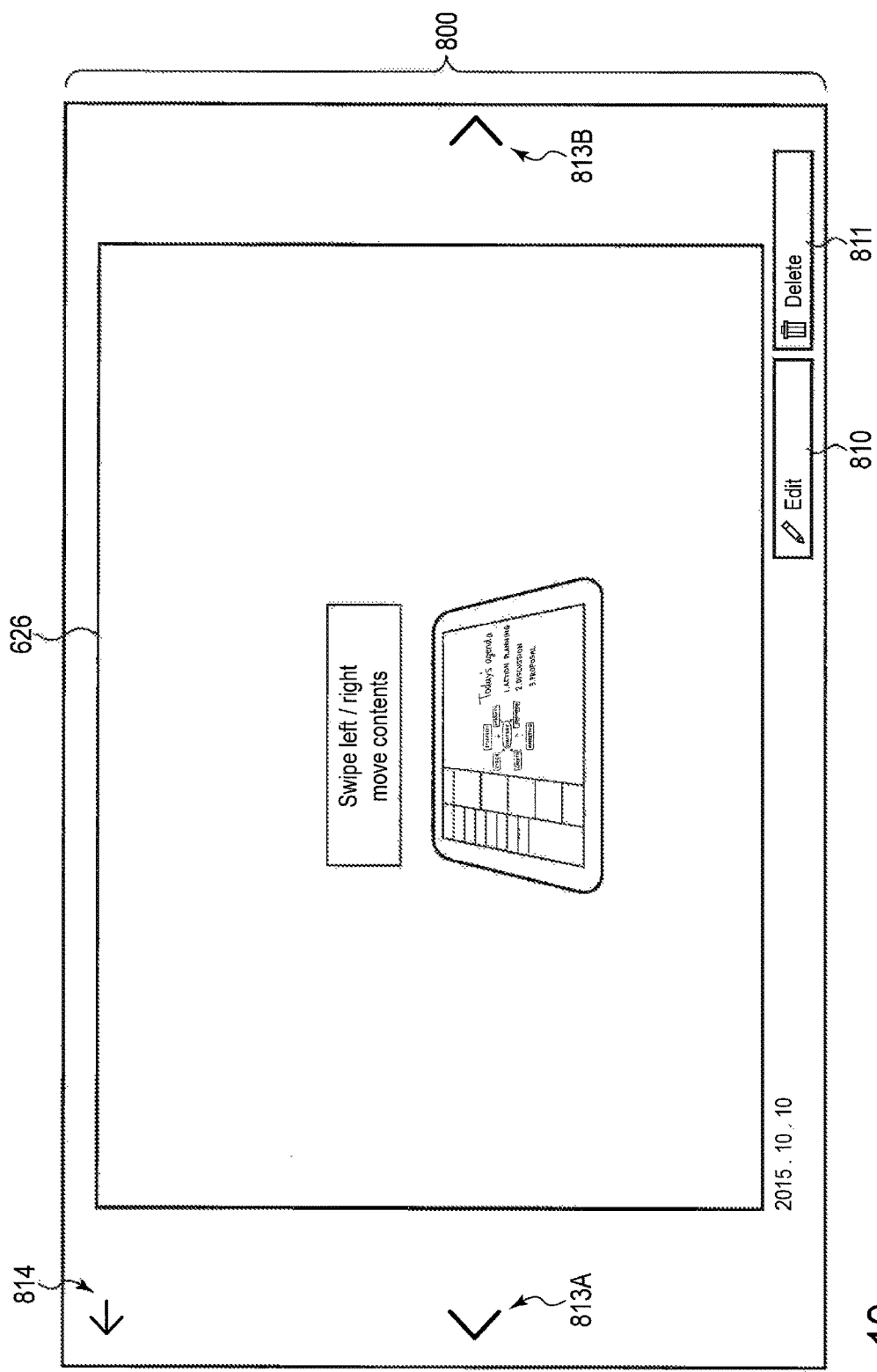
FIG. 19 is a view showing an example of content displayed by the electronic apparatus in a preview mode.

When the user taps content 626 displayed on the all-content list view 600, as shown in FIG. 18, the processing module 308 selects the content 626. Then, the processing module 308 displays a preview screen 800 as shown in FIG. 19.

The preview screen 800 enables the user to view content on a full screen. The content 626 is displayed on the preview screen 800 while being enlarged. Also, the user can move the content frontwards or rearwards by a finger gesture (swipe) on the preview screen 800 or tapping an arrow button 813A or 813B. Contents displayed on the preview screen 800 are changed in the same order as the order in which the contents on the all-content list view 600 are arranged. Furthermore, the user can set an edit mode by tapping an edit button 810 displayed on the preview screen 800, and also delete content being currently previewed, by tapping a delete button 811 displayed on the preview screen 800. Also, the user can return the image to be displayed to the all-content list view 600 by tapping a return button 814 displayed on the preview screen 800.

Figure 20:
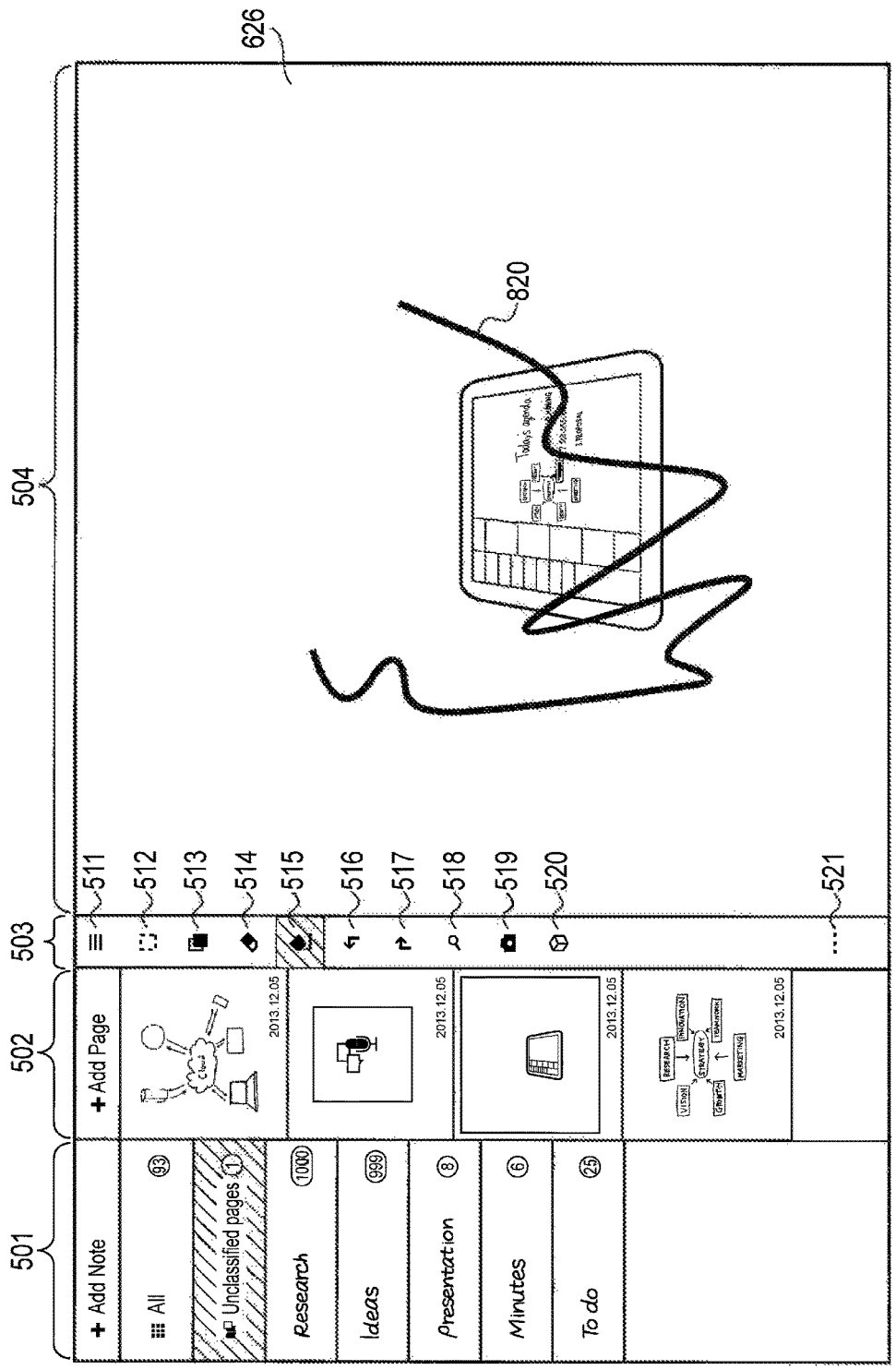
FIG. 20 is a view showing an example of an edit view (edit screen) for editing content selected in the preview mode by handwriting.

For example, when the user taps the edit button 810, for example, with content 626 displayed on the preview screen 800, the processing module 308, as shown in FIG. 20, causes an edit view to be displayed, and also causes the content 626 to be displayed in the edit view area 504. The user can draw a stroke by handwriting on the content 626. To be more specific, based on a handwriting input operation by the user, the processing module 308 writes a stroke (for example, a handwritten stroke 820) on the content 626 to edit the content 626. The edited content 626 may be automatically saved.

If the user requests displaying of the all-content list view 600 after editing the content 626, a thumbnail of the content 626 including the handwritten stroke appears in the content list on the all-content list view 600.

Figure 21:
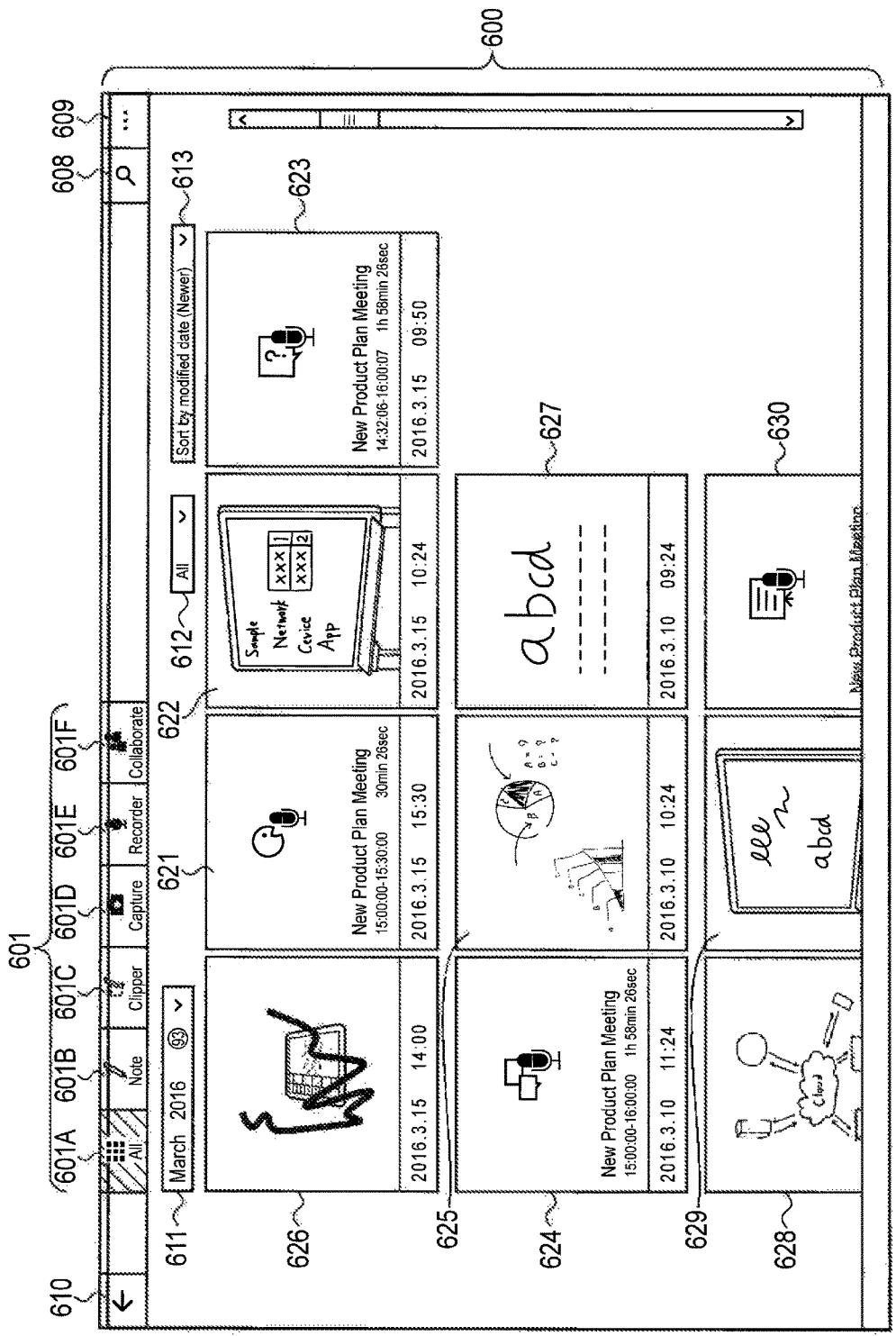
FIG. 21 is a view showing an example of an all-content list view (all-content list screen) displayed by the electronic apparatus as shown in FIG. 1 after the content is edited on the edit view as shown in FIG. 20.

In the case where "modified date (Newer)" is set as the sorting order, as shown in FIG. 21, a thumbnail of content 626 in which a handwritten stroke is reflected is displayed at the upper left end of the content list on the all-content list view 600.

Figure 22:
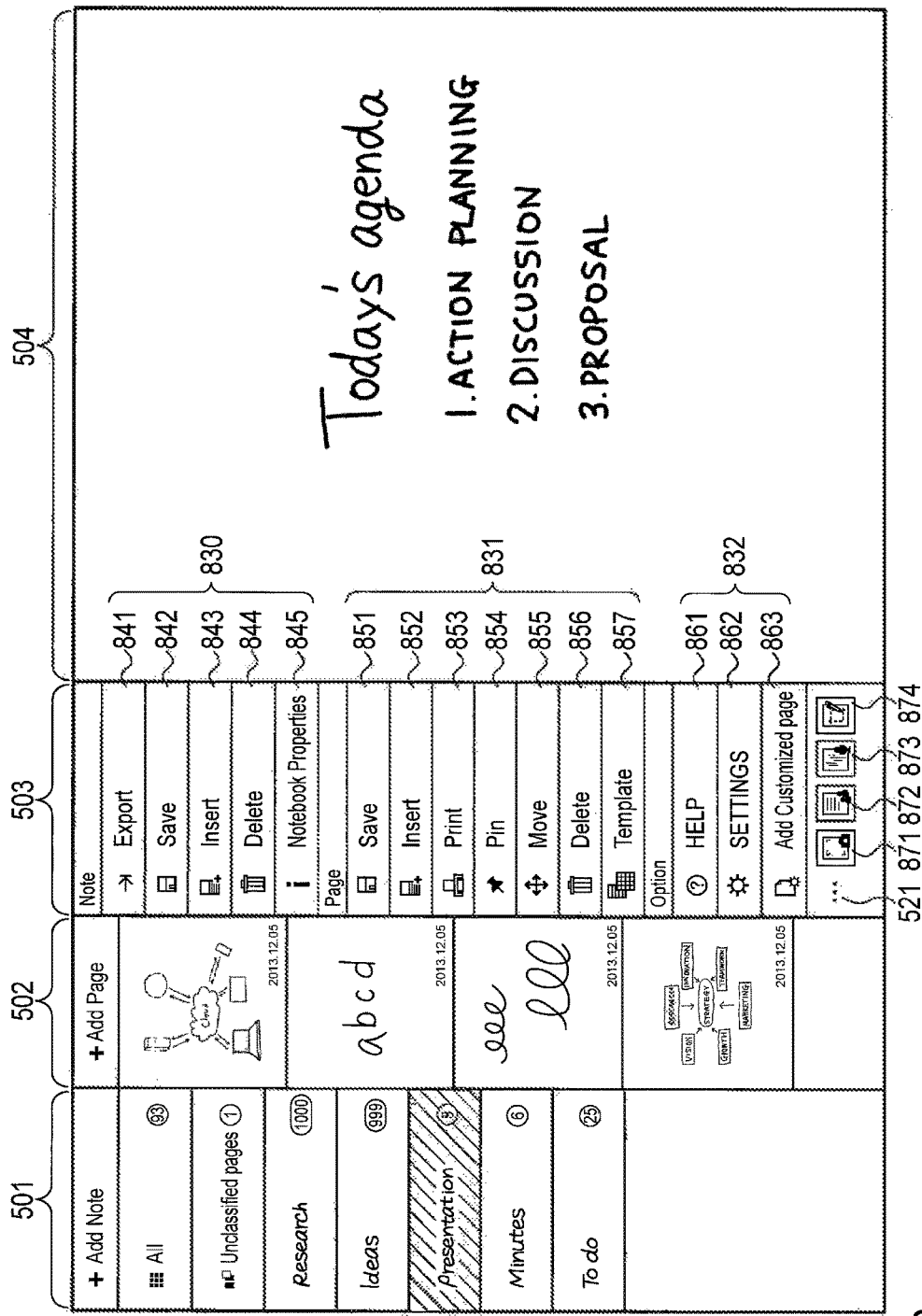
FIG. 22 is a view showing an example of an edit tool bar displayed on the edit view by the electronic apparatus as shown in FIG. 1.

FIG. 22 shows an example of an edit tool bar displayed on the edit view.

When the user taps a "menu bar" button 521 in the edit tool bar 503 shown in FIG. 8, the edit tool bar 503 is enlarged in the lateral direction, as shown in FIG. 22, and a menu different from the edit menu as shown in FIG. 8 is displayed.

The edit tool bar 503 includes a note operation menu 830, a page operation menu 831, an option setting menu 832, "menu bar" button 521, "capture application program" button 871, "collaboration application program" button 872, "voice recorder application program" button 873 and "clipper application program" button 874.

The note operation menu 830 includes "Export" button 841, "Save" button 842, "Insert" button 853, "Delete" button 844 and "Notebook Properties" button 845.

The page operation menu 831 includes "Save" button 851, "insert" button 852, "Print" button 853, "Pin" button 854, "Move" button 855, "Delete" button 856 and "Template" button 857.

The option setting menu 832 includes "HELP" button 861, "SETTINGS" button 862 and "Add Customized Page" button 863.

The "capture application program" button 871 is a button for launching the capture application program 203. When "capture application program" button 871 is tapped by the user, the processing module 308 launches the capture application program 203. Image data (content) concerning an image captured by the capture application program 203 is imported (pasted) to the edit view area 504.

The "collaboration application program" button 872 is a button for launching the collaboration application program 206. When "collaboration application program" button 872 is tapped by the user, the processing module 308 launches the collaboration application program 206.

The "voice recorder application program" button 873 is a button for launching the voice recorder application program 204. When "voice recorder application program" button 873 is tapped by the user, the processing module 308 launches the voice recorder application program 204.

The "clipper application program" button 874 is a button for launching the clipper application program 205. When "clipper application program" button 874 is tapped by the user, the processing module 308 launches the clipper application program 205.

Figure 23:
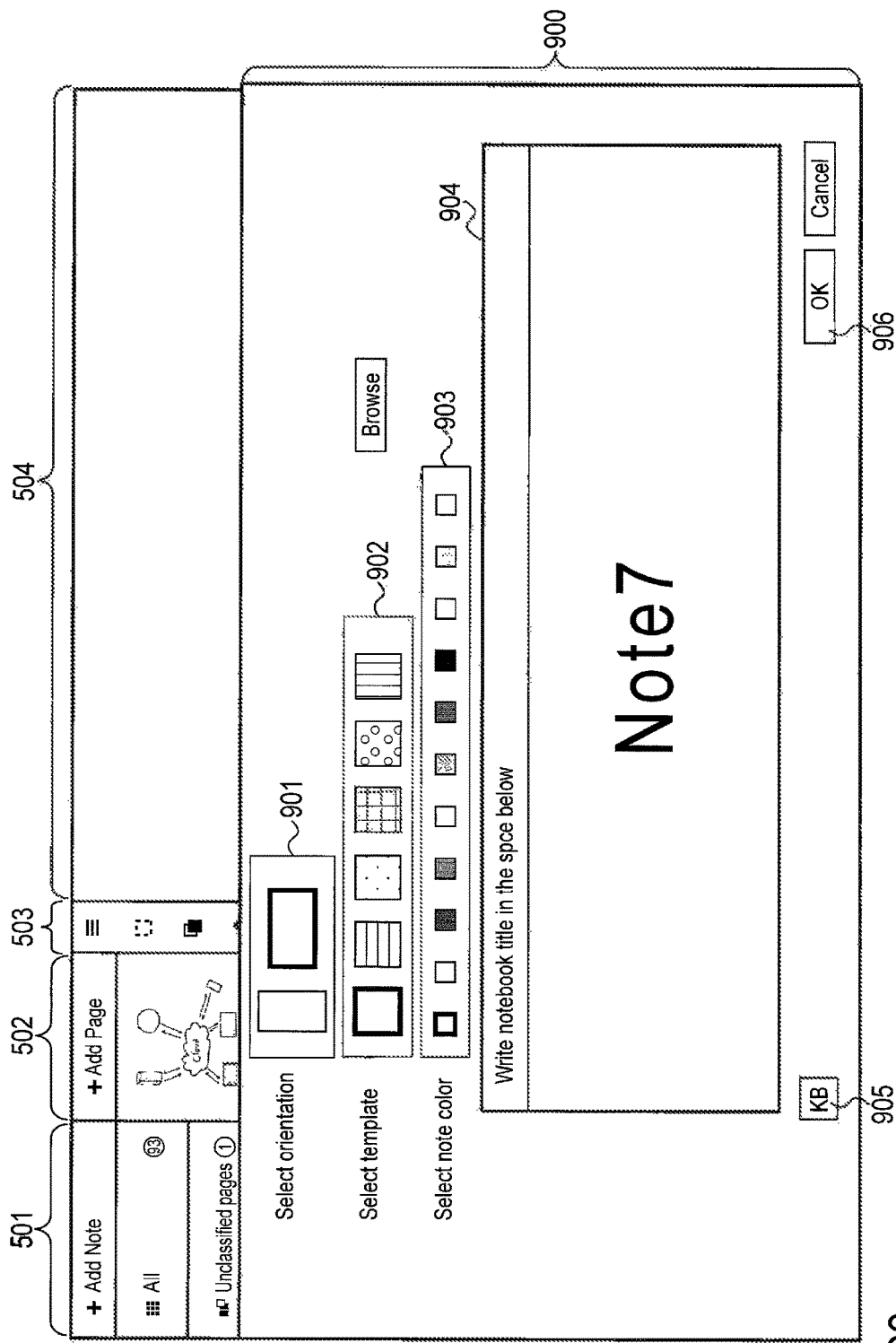
FIG. 23 is a view showing an example of a note property setting screen displayed on the electronic apparatus as shown in FIG. 1 at the time of executing an addition note processing or a note property changing processing.

FIG. 23 shows an example of a note property setting screen displayed on the edit view at the time of executing an addition note processing or a note property changing processing.

The note property setting screen 900 includes a page orientation setting portion 901, a page template setting portion 902, a note color setting portion 903, a note name inputting area 904, "keyboard" button 905, and "OK" button 906.

The page orientation setting portion 901 displays a "portrait" icon indicating a page which is oriented vertically long and a "landscape" icon indicating a page which is oriented horizontally long. When the "portrait" icon is tapped by the user, the processing module 308 selects a vertically long page (portrait page). When the "landscape" icon is tapped by the user, the processing module 308 selects a horizontally long page (landscape page).

The page template setting portion 902 displays a plurality of template icons corresponding to a plurality of kinds of page templates which are defined by setting in combination the presence/absence of ruled lines, the kind of ruled lines, the presence/absence of a background image, a background color, etc. When an arbitrary template icon is tapped by the user, the processing module 308 selects a page template corresponding to the tapped template icon.

The note color setting portion 903 displays a plurality of "color" icons corresponding to colors which can be used as the colors of notes, respectively. Ordinarily, a note color corresponding to the first one of the "color" icons is automatically selected. The order in which the "color" icons are arranged is changed each time a note color of a note is selected. For example, in this case, the first "color" icon is moved to bring up the rear, and each of the remaining icons from the second "color" icon onward is moved leftwards by one icon.

Also, the user can select one of the "color" icons. To be more specific, when an arbitrary "color" icon is tapped by the user, the processing module 308 selects a note color corresponding to the tapped "color" icon.

The note name inputting area 904 is a handwriting input area in which a handwriting input operation can be performed. The user can input a character string (note name) by handwriting to the note name inputting area 904.

The "keyboard" button 905 is a button for displaying a software keyboard. When "keyboard" button 905 is tapped by the user, the processing module 308 causes the software keyboard to be displayed. The user can input a character string of a note name using the software keyboard.

When "OK" button 906 is tapped by the user, the processing module 308 adds a note or changes a note property of an existing note based on the settings of the page orientation setting portion 901, the page template setting portion 902, the note color setting portion 903, the note name inputting area 904, etc.

Figure 24:
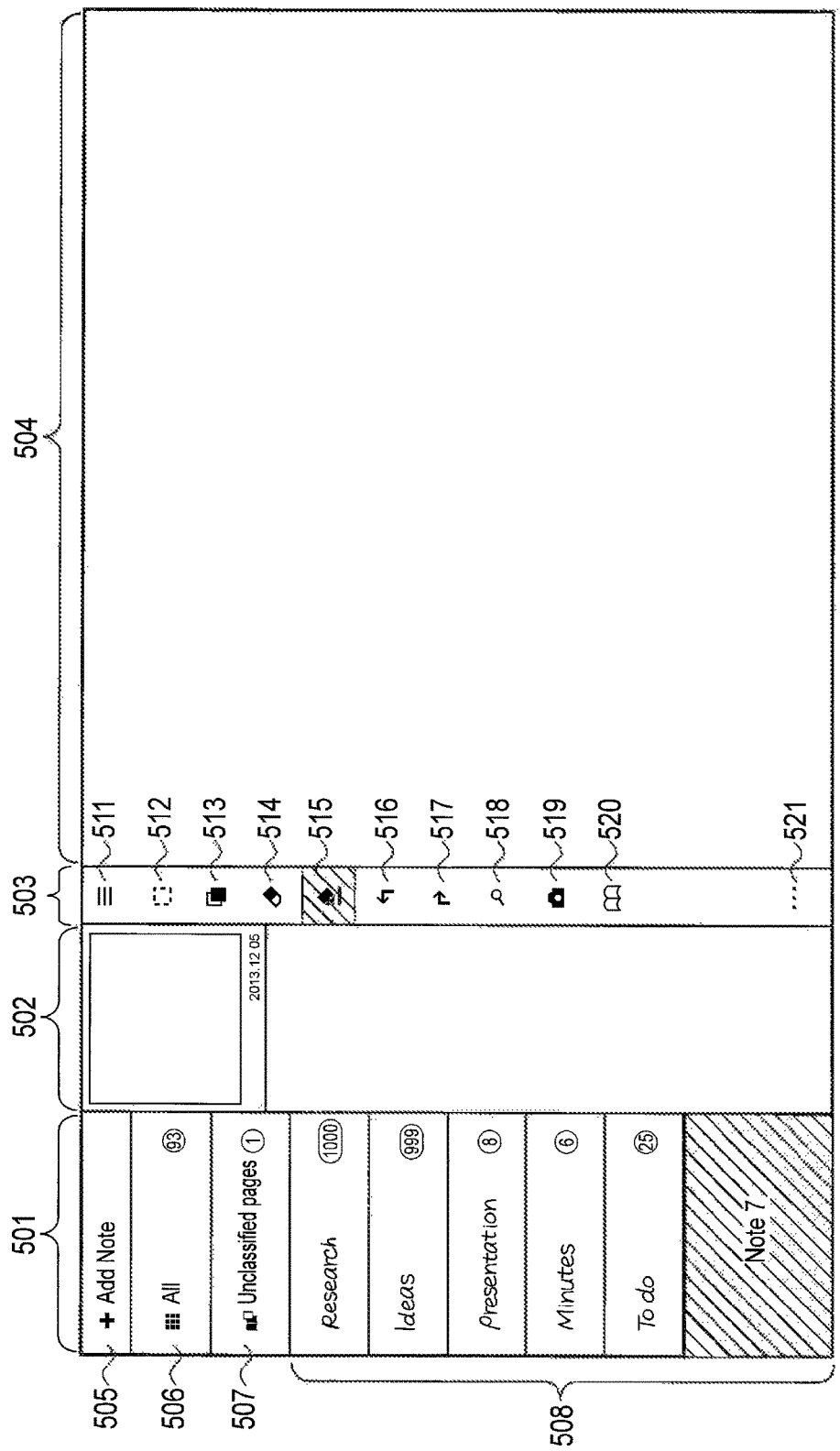
FIG. 24 is a view showing an example of an edit view displayed by the electronic apparatus after the addition note processing.

FIG. 24 shows an example of an edit view which is displayed by the processing module 308 after the addition note processing.

When a note having the title name "Note 7" is added, a note icon (the title name "Note 7") is added to the notebook list 501. When the note icon (the title name "Note 7") is tapped by the user, it is highlighted in the color of "Note 7", and a thumbnail of a new page included in the note having the title name "Note 7" is displayed in the page list 502. This thumbnail may also be displayed in the color of "Note 7". Also, the background of the edit tool bar 503 may be displayed in the color of "Note 7".

FIG. 25 shows an example of a search screen 910 displayed on the all-content list view 600.

The search screen 910 is displayed when the user taps the "search" button 608 displayed on the all-content list view 600.

The search screen 910 includes a search key input area 911 and a handwriting candidate area 912. When the user inputs a stroke (temporary stroke) by handwriting in the search key input area 911, some handwriting candidates are displayed by the auto-complete function in the handwriting candidate area 912. When one of the handwriting candidates is selected by the user, the selected handwriting candidate is displayed in the search key input area 911.

When the user taps "OK" button 914 in a state in which handwriting such as a handwritten character string, a handwritten mark and a handwritten figure is been input in the search key input area 911 as query strokes, the processing module 308 searches all contents including handwritten pages and contents created by other application programs, for contents including handwriting which matches handwriting (query strokes) applied as a search key, or contents including a character string (text) corresponding the query strokes. Therefore, on the all-content list view 600 of the handwritten note application program 202, a crossover search can be performed on a plurality of kinds of contents created by a plurality of kinds of application programs.

On the search screen 910, "keyboard" button 913 is also displayed. When "keyboard" button 913 is tapped by the user, the software keyboard is displayed. The user can input a character string (text) as a search key by operating the software keyboard. In this case, the processing module 308 searches all the contents including the handwritten pages and the contents created by the other application programs for contents including the character string (text) (text search). Each of the handwritten pages may include the result of character recognition of each of handwritten character strings in each handwritten page. Thereby, in the text search, a character string corresponding to the text applied as a search key can be searched for from each of the handwritten pages.

Figure 26:
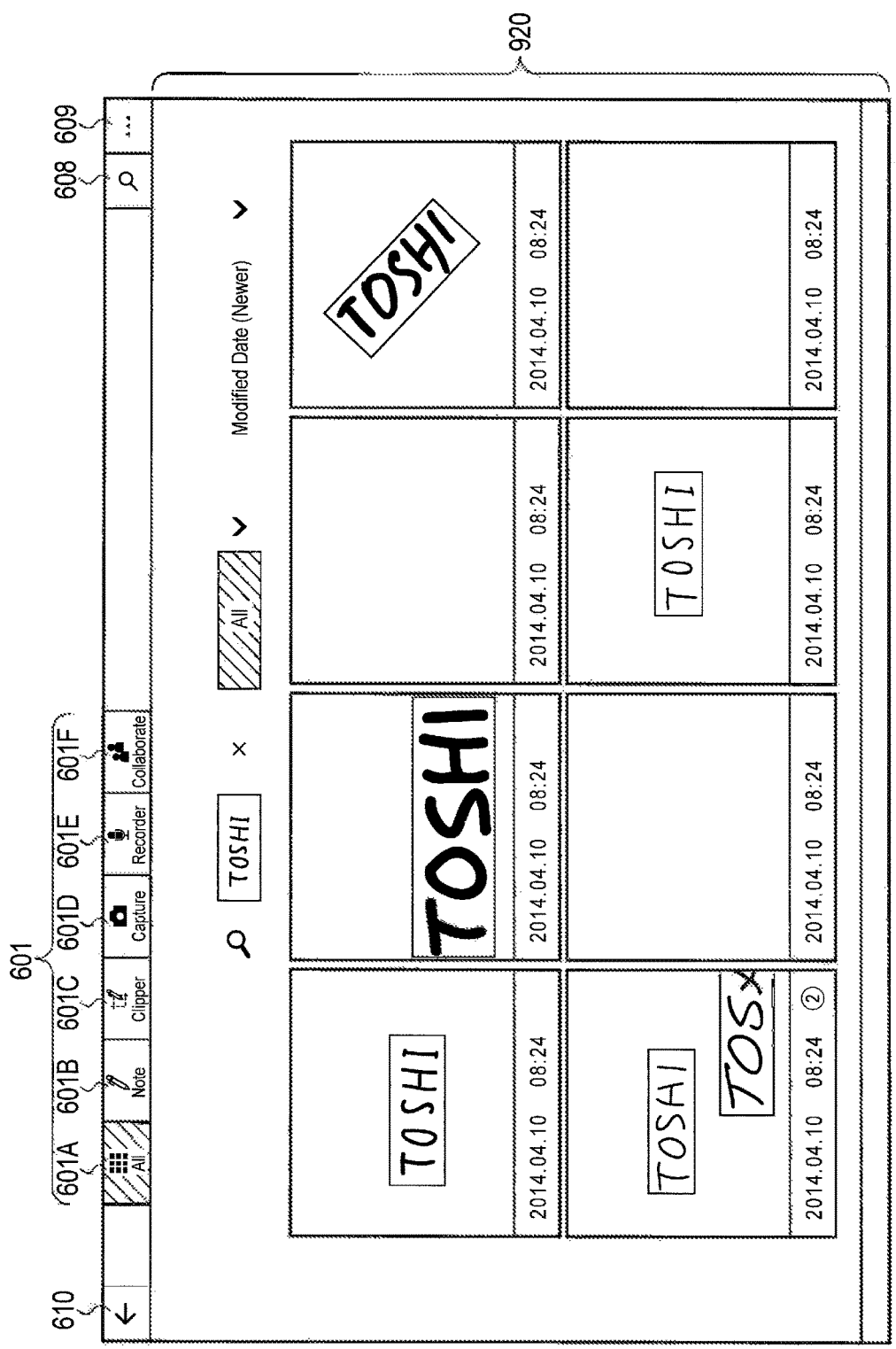
FIG. 26 is a view showing an example of a search result screen displayed by the electronic device as shown in FIG. 1.

FIG. 26 shows an example of a search result screen 920 displayed on the all-content list view 600.

In the following explanation, it is assumed that the handwritten character string "TOSHI" is used as a search key. In each of handwritten pages including the handwritten character string "TOSHI", the handwritten character string "TOSHI" is highlighted as a hit word. Furthermore, in the case where some contents including a text corresponding to the handwritten character string "TOSHI" are present, each of hit words included in those contents is also highlighted.

It should be noted that on the search result screen 920, of all the contents including the handwritten pages and the contents created by the other application programs, only contents including a hit word (a handwritten character string or text) may be displayed.

The flowchart of FIG. 27 shows a procedure of an edit view/all-content listing view display processing which is executed by the CPU 101 when the handwritten note application program 202 is executed by the tablet computer 10.

When the handwritten note application program 202 is launched or the handwritten note application program 202 is changed from a non-active state to an active state (Yes in step S11), the CPU 101 acquires from the cache folder 212 contents (data files) created by each of the other application programs (step S12). It should be noted that an application program being in an active state means that the application program is in the foreground, i.e., the application program is launched and focused.

Then, the CPU 101 stores the acquired content as contents in Unclassified Note 217, in the handwritten-note application folder 214 (step S13).

The CPU 101 displays the above edit view on the screen of the LCD 17A (step S14). When a user's input (for example, a tap operation) for operating an "All" icon 506 is detected (Yes in step S15), the CPU 101 executes a content list display processing for displaying the all-content list view 600 on the screen of the LCD 17A (step S16).

The flowchart of FIG. 28 shows a procedure of the content list display processing.

The CPU 101 accesses a storage device (e.g., handwritten-note application folder 214) to acquire all contents in the storage device (e.g., handwritten-note application folder 214), i.e., all the contents including the handwritten pages and the contents created by the other application programs (step S21). The CPU 101 sorts all those contents in accordance with the dates and times at which the contents were created.

The CPU 101 causes contents created on the last day or earliest day to be displayed in a present display area (display column) such that the contents created on the last day or earliest day are arranged in a chronological order on the present display area (which in this case, corresponds to the upper most display area of the all-content list view 600) (step S23). Each of those contents is displayed in the color (note color) of a note to which the content belongs.

In the case where the date and time at which content to be subsequently displayed was created is different from the date and time of a group of contents displayed in the present display area (Yes in step S24) or the number of contents displayed in the present display area reaches the maximum number of contents displayable in a single display area (Yes in step S25), the CPU 101 changes the display area for use in displaying the content to be subsequently displayed to a subsequent display area (display area of a next row) (step S26).

By virtue of this content list display processing, of the plurality of kinds of contents including handwritten pages, recordings of voice, photos (images), etc., a plurality kinds of contents created in the same time period (for example, on the same day) can be displayed in positions close to each other.

That is, the thumbnails of all the contents are arranged two-dimensionally, and are arranged in a chronological order with respect to a first direction (e.g., vertical direction). The thumbnails of the contents which are created by the applications 202 to 206 in a certain time period are arranged in accordance with a certain position (e.g., a certain row position) on the first direction, and the thumbnails of the contents which are created by the applications 202 to 206 in a subsequent time period are arranged in accordance with another position (e.g., a next row position) on the first direction which is adjacent to the first position. The thumbnails of the contents which are created by the applications 202 to 206 in the certain time period are arranged along a second direction (e.g., lateral direction) perpendicular to the first direction, and the thumbnails of the contents which are created by the applications 202 to 206 in the subsequent time period are arranged along the second direction.

The flowchart of FIG. 29 shows a procedure of a filtering processing.

When a user's input (tap operation) to operate any of "Note Filtering" button 601B, "Clipper Filtering" button 601C, "Capture Filtering" button 601D, "Recorder Filtering" button 601E and "Collaboration Filtering" button 601F on the all-content list view 600 as shown in FIG. 10 is detected (Yes in step S31), the CPU 101 extracts only contents created by the application program associated with the selected button, from all the contents including the handwritten pages and the contents created by the other application programs (step S32). Then, the CPU 101 executes the content list display processing to display a list of extracted contents on the all-content list view 600 (step S33). In step S33, of the extracted contents, only contents created on the same day is displayed in a chronological order on the same display area. That is, the thumbnails of the extracted contents are arranged two-dimensionally according to the first direction and t second direction, and are arranged in a chronological order with respect to the first direction. The thumbnails of the contents which are created by the selected application in a certain time period are arranged in accordance with a certain position (e.g., a certain row position) on the first direction, and the thumbnails of the contents which are created by the selected application in a subsequent time period are arranged in accordance with another position (e.g., a next row position) on the first direction which is adjacent to the first position. The thumbnails of the contents which are created by the selected application in the certain time period are arranged along the second direction, and the thumbnails of the contents which are created by the selected application in the subsequent time period are arranged along the second direction.

Figure 30:
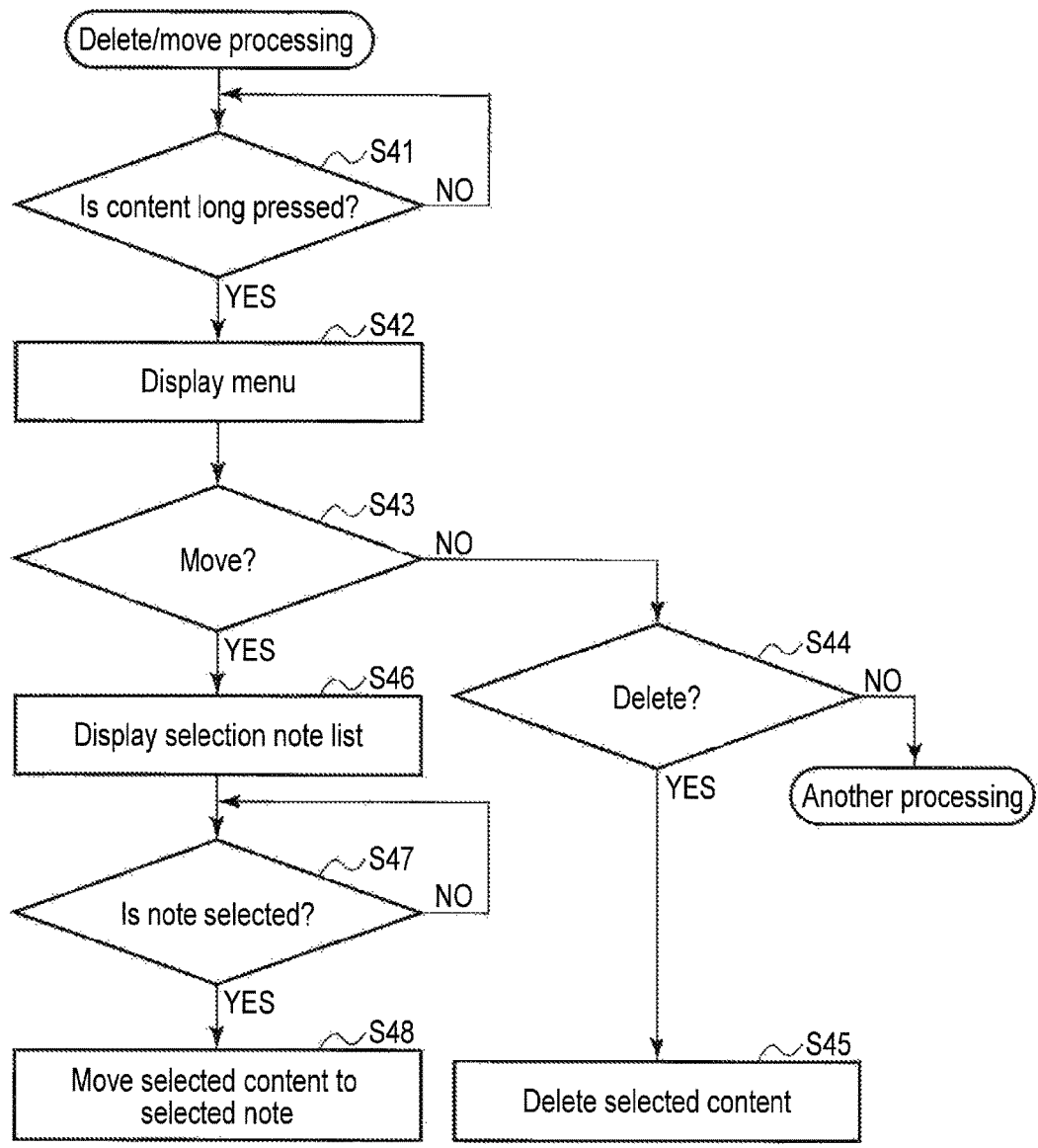
FIG. 30 is an exemplary flowchart showing a procedure of a delete/move processing which is executed by the electronic device as shown in FIG. 1.

The flowchart of FIG. 30 shows a procedure of a delete/move process.

When a user's operation to select given content on the all-content list view 600 (for example, an operation to long press the content) is detected (Yes in step S41), the CPU 101 causes the menu 640 explained with reference to FIG. 15 to be displayed on the all-content list view 600 (step S41).

When a user's input (tap operation) to operate the move button 641 in the menu 640 is detected (YES in step S43), the CPU 101 causes the selection note list 650 explained with reference to FIG. 16 to be displayed on the all-content list view 600 (step S46). When a given note in the selection note list 650 is selected by the user (YES in step S47), the CPU 101 moves the selected content to the selected note (step S48).

When a user's input (tap operation) to operate the delete button 642 in the menu 640 is detected (YES in step S44), the CPU 101 deletes the selected content (step S45).

Figure 31:
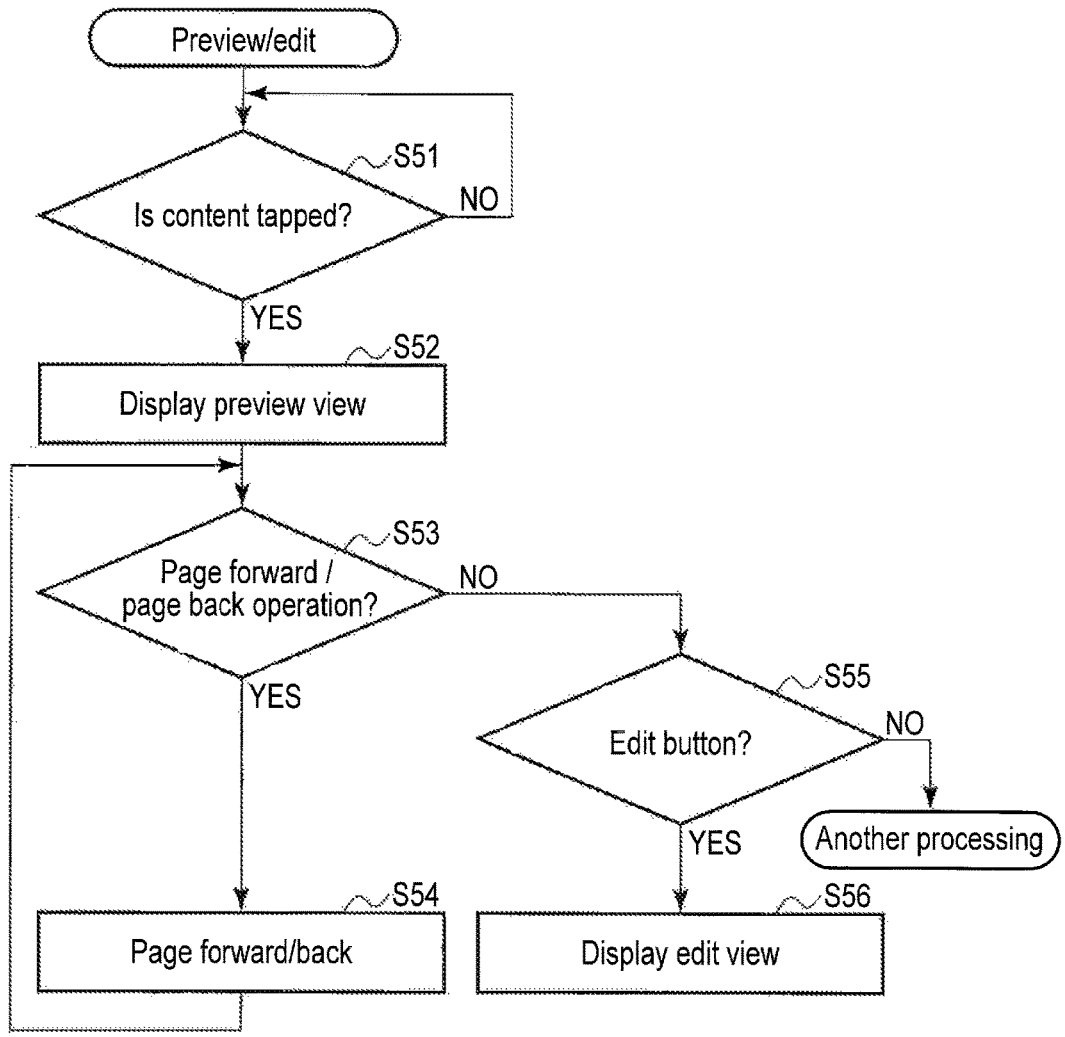
FIG. 31 is an exemplary flowchart showing a procedure of a preview/edit processing which is executed by the electronic device as shown in FIG. 1.

The flowchart of FIG. 31 shows a procedure of a preview/edit processing.

When a user's operation (tap) to select given content on the all-content list view 600 is detected (YES in step S51), the CPU 101 enters the preview mode capable of turning over the pages, and causes the preview screen 800 explained with reference to FIG. 19 to be displayed (step S51). In the preview screen 800, the selected content is displayed in full-screen.

When a user's input for a page forward or page back (swipe or an operation of an arrow button) is detected (step S53), the CPU 101 changes content to be displayed on the preview screen 800 to subsequent content or precedent content (step S54).

When a user' operation (tap) to operate the edit button 810 on the preview screen 800 is detected (YES in step S55), the CPU 101 causes the edit view to be displayed, and causes content presently displayed on the preview screen 800 to be displayed in the edit view area 504 in the edit view (step S56). In the step S56, based on the handwriting input operation by user, the CPU 101 writes a handwritten stroke or strokes on the content on the edit view area 504 to edit the content.

As explained above, according to the embodiment, a plurality of kinds of contents created by a plurality of kinds of application programs are managed by the handwritten note application program 202, and of the plurality of kinds of contents, contents created in the first time period are displayed in a chronological order on a given single display area (first display area) on the screen. For example, one or more contents created by the handwritten note application program 202 in the first time period and one or more contents created by one or more application programs other than the handwritten note application program 202 in the first time period are displayed in a chronological order on the first display area. One or more contents created by the handwritten note application program 202 in a second time period after the first time period and one or more contents created by one or more application programs other than the handwritten note application program 202 in the second time period are displayed in a chronological order on the second display area.

In other word, the contents which are created by the application programs are arranged two-dimensionally according to a first direction (e.g., vertical direction) and a second direction (e.g., lateral direction). The first direction represents a chronological order, and the second direction is perpendicular to the first direction. The contents created by the programs in the first time period are arranged in accordance with a certain position on the first direction, and are arranged along the second direction. The contents created by the programs in the second time period are arranged in accordance with another position on the first direction, and are arranged along the second direction.

Therefore, since handwritten pages, recording of voice data and image data on a whiteboard/paper material with respect to, for example, the same conference, can be displayed in locations close to each other, it is possible to present the relevance between a plurality of contents created by a plurality of kinds of application programs such that it can be easily understood by the user.

It should be noted that with respect to the embodiment, although it is explained above that the handwritten note application program 202 has the all-content list display function, an application program other than the handwritten note application program 202, for example, the capture application program 203, the voice recorder application program 204, the clipper application program 205 or the collaboration application program 206 may have the all-content list display function.

Also, it should be noted that various functions disclosed with respect to the embodiment may also be each obtained as a processing circuit. Examples of the processing circuit include a programmed hardware processor such as a central processing unit (CPU). The processor executes each of the described functions by executing a computer program (instructions) stored in a memory. The processor may be a microprocessor including an electric circuit. Examples of the processing circuit include a digital signal processor (DSP), an application-specific integrated circuit (ASIC), a microcontroller, a controller and other electric circuit components. Each of the components other than the CPU which are described with respect to the embodiment may also be obtained as a processing circuit.

In addition, since various types of processing according to the embodiment can be achieved by the computer program, it is possible to easily obtain the same advantages as in the embodiment simply by installing the computer program in a computer via a computer-readable storage medium storing the computer program and by executing the computer program.

A CPU in the computer in which the computer program is installed can function as a processor configured to execute the above all-content list display processing.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display;
a storage that stores a first content, a second content, a third content, and a fourth content, the first content being created by a first application in a first time period, the second content being created by a second application different from the first application in the first time period, the third content being created by the first application in a second time period after the first time period, the fourth content being created by the second application in the second time period; and
a hardware processor that displays on the display a first thumbnail of the first content, a second thumbnail of the second content, a third thumbnail of the third content and a fourth thumbnail of the fourth content, on the basis of the first application,
wherein:
the first application is one of an application to input handwriting, an application to capture an image, an application to record voice, and an application to clip a part of a document, and has a function for cooperating with the second application;
the second application is another one of the application to input handwriting, the application to capture an image, the application to record voice and the application to clip a part of a document;
the second application is different from the first application;
the first to fourth thumbnails are arranged two-dimensionally according to a first direction and a second direction;
the first direction represents a chronological order;
the second direction is perpendicular to the first direction;
both the first and second thumbnails are arranged in accordance with a first display region on the first direction;
both the third and fourth thumbnails are arranged in accordance with a second display region on the first direction, the second display region being adjacent to the first display region;
the first and second thumbnails are arranged along a second direction;
the third and fourth thumbnails are arranged along the second direction,
the second application has a function of saving the second content and the fourth content into a first storage region for the second application in the storage, and a function of saving a copy of the second content and a copy of the fourth content into a second storage region in the storage, the second storage region being a storage region that is shared by the first application and the second application,
the first application has a function of obtaining the copy of the second content and the copy of the fourth content that are saved into the second storage region, a function of saving the copy of the second content and the copy of the fourth content into a third storage region for the first application in the storage, a function of displaying the first thumbnail of the first content that is created by the first application in the first time period and the second thumbnail of the second content that is created by the second application in the first time period on the first display region in a chronological order, and a function of displaying the third thumbnail of the third content that is created by the first application in the second time period and the fourth thumbnail of the fourth content that is created by the second application in the second time period on the second display region in a chronological order, the first thumbnail, the second thumbnail, the third thumbnail, and the fourth thumbnail being displayed two-dimensionally, and
the functions of the first and second application are executed by the hardware processor.

2. The electronic apparatus of claim 1, wherein
the second application is the application to record voice, and the second and fourth thumbnails each include at least part of meta data of voice and an icon indicating a kind of recording data, wherein the meta data includes a recording date of the voice, when one of the second thumbnail or the fourth thumbnail is taped, details of meta data corresponding to the one of the second thumbnail or the fourth thumbnail are displayed.

3. The electronic apparatus of claim 1, wherein the storage further stores a fifth content created by the second application in the first time period and a sixth content created by the second application in the second time period, the hardware processor is further configured to display the second thumbnail, the fourth thumbnail, a fifth thumbnail of the fifth content and a sixth thumbnail of the sixth content on the display to arrange the second thumbnail, the fourth thumbnail, the fifth thumbnail and the sixth thumbnail two-dimensionally if the hardware processor receives, from a filtering operation in the first application, a user operation for displaying only contents created by the second application, both the second and fifth thumbnails that are created in the first time period are arranged in accordance with the first display region on the first direction, both the fourth and sixth thumbnails that are created in the second time period are arranged in accordance with the second display region on the first direction, in the first display region, the second and fifth thumbnails are arranged along the second direction in a chronological order, and in the second display region, the fourth and sixth thumbnails are arranged along the second direction in a chronological order.

4. The electronic apparatus of claim 1, wherein the first application is the application to input handwriting, and the hardware processor enlarges a content corresponding to one of the thumbnails that is selected in accordance with a user's tap operation on the display, displays the enlarged content on a preview screen, edits the content by writing a handwritten stroke on the enlarged content on the basis of a user's handwriting operation, and changes the selected one of the thumbnails to an image of handwriting included in the content.

5. A method executed by an electronic apparatus including a hardware processor, the method comprising:

obtaining first to fourth contents in a storage medium, the first content being created by a first application in a first time period, the second content being created by a second application different from the first application in the first time period, the third content being created by the first application in a second time period after the first time period, the fourth content being created by the second application in the second time period; and displaying on a display a first thumbnail of the first content, a second thumbnail of the second content, a third thumbnail of the third content and a fourth thumbnail of the fourth content, wherein:

the first application is one of an application to input handwriting, an application to capture an image, an application to record voice, and an application to clip a part of a document, and has a function for cooperating with the second application;

the second application is another one of the application to input handwriting, the application to capture an image, the application to record voice and the application to clip a part of a document;

the first to fourth thumbnails are arranged two-dimensionally according to a first direction and a second direction, the first direction represents a chronological order;

the second direction is perpendicular to the first direction;

both the first and second thumbnails are arranged in accordance with a first display region on the first direction;

both the third and fourth thumbnails are arranged in accordance with a second display region on the first direction, the second display region being adjacent to the first display region;

the first and second thumbnails are arranged along a second direction;

the third and fourth thumbnails are arranged along the second direction;

the second application has a function of saving the second content and the fourth content into a first storage region for the second application in the storage, and a function of saving a copy of the second content and a copy of the fourth content into a second storage region in the storage, the second storage region being a storage region that is shared by the first application and the second application;

the first application has a function of obtaining the copy of the second content and the copy of the fourth content that are saved into the second storage region, a function of saving the copy of the second content and the copy of the fourth content into a third storage region for the first application in the storage, a function of displaying the first thumbnail of the first content that is created by the first application in the first time period and the second thumbnail of the second content that is created by the second application in the first time period on the first display region in a chronological order, and a function of displaying the third thumbnail of the third content that is created by the first application in the second time period and the fourth thumbnail of the fourth content that is created by the second application in the second time period on the second display region in a chronological order, the first thumbnail, the second thumbnail, the third thumbnail, and the fourth thumbnail being displayed two-dimensionally; and the functions of the first and second application are executed by the hardware processor.

6. The method of claim 5, wherein the second application is the application to record voice, and the second and fourth thumbnails each include at least part of meta data of voice and an icon indicating a kind of recording data, wherein the meta data includes a recording date of the voice, when one of the second thumbnail or the fourth thumbnail is taped, details of meta data corresponding to the one of the second thumbnail or the fourth thumbnail are displayed.

7. The method of claim 5, wherein if the storage medium further stores the fifth content created by the second application in the first time period and a sixth content created by the second application in the second time period, and a user operation for displaying only contents created by the second application is received from a filtering operation in the first application, the displaying displays the second thumbnail, the fourth thumbnail, a fifth thumbnail of the fifth content and a sixth thumbnail of the sixth content on the display to arrange the second thumbnail, the fourth thumbnail, the fifth thumbnail and the sixth thumbnail two-dimensionally, both the second and fifth thumbnails that are created in the first time period are arranged in accordance with the first display region on the first direction, both the fourth and sixth thumbnails that are created in the second time period are arranged in accordance with the second display region on the first direction, in the first display region, the second and fifth thumbnails are arranged along the second direction in a chronological order, and in the second display region, the fourth and sixth thumbnails are arranged along the second direction in a chronological order.

8. The method of claim 5, wherein the first application is the application to input handwriting, enlarging a content corresponding to one of the thumbnails that is selected in accordance with a user's tap operation on the display and displaying the enlarged content on a preview screen; and editing the content by writing a handwritten stroke on the enlarged content on the basis of a user's handwriting operation and changing the selected one of the thumbnails to an image of handwriting included in the content.

* * * * *